US012754310B2

(12) United States Patent
Short, Jr. et al.

(10) Patent No.: US 12,754,310 B2
(45) Date of Patent: Oct. 6, 2026

(54) DYNAMIC PHASED ARRAY RESONATOR SYSTEMS AND METHODS FOR DETERMINING A MATERIAL SUBSTANCE

(71) Applicant: QUANTUM IP, LLC, Stuart, FL (US)

(72) Inventors: Robert J. Short, Jr., Stuart, FL (US); Lee Duke, Stuart, FL (US)

(73) Assignee: QUANTUM IP, LLC, Stuart, FL (US)

( * ) Notice: Subject to any disclaimer, the term of this patent is extended or adjusted under 35 U.S.C. 154(b) by 0 days.

(21) Appl. No.: 18/922,693

(22) Filed: Oct. 22, 2024

(65) Prior Publication Data

US 2026/0009893 A1 Jan. 8, 2026

Related U.S. Application Data

(60) Provisional application No. 63/667,561, filed on Jul. 3, 2024.

(51) Int. Cl.

| | |
|---|---|
| ***G01S 13/88*** | (2006.01) |
| ***G01S 7/03*** | (2006.01) |
| ***H01Q 3/36*** | (2006.01) |

(52) U.S. Cl.

CPC .............. *G01S 13/887* (2013.01); *G01S 7/03* (2013.01); *G01S 13/885* (2013.01); *H01Q 3/36* (2013.01)

(58) Field of Classification Search

CPC ........ G01S 13/887; G01S 7/03; G01S 13/885; G01S 7/4026; G01S 7/417;

(Continued)

(56) References Cited

U.S. PATENT DOCUMENTS

| | | | |
|---|---|---|---|
| 2,116,717 | A | 5/1938 | Hans |
| 3,725,917 | A | 4/1973 | Sletten et al. |

(Continued)

FOREIGN PATENT DOCUMENTS

| | | | | |
|---|---|---|---|---|
| CN | 107102325 A * | 8/2017 | .......... | G01S 13/887 |
| CN | 117091456 | 11/2023 | | |

(Continued)

OTHER PUBLICATIONS

D. Erricolo et al., "Machine Learning in Electromagnetics: A Review and Some Perspectives for Future Research," 2019 International Conference on Electromagnetics in Advanced Applications (ICEAA), Granada, Spain, 2019, pp. 1377-1380, doi: 10.1109/ICEAA.2019.8879110 (Year: 2019).*

(Continued)

*Primary Examiner* — Yonghong Li
(74) *Attorney, Agent, or Firm* — Polsinelli LLP

(57) ABSTRACT

Embodiments described relate to a system for material detection and identification, The system may include a transmitter unit configured to transmit an RF signal at a resonance frequency for a material. The system may also include a phased array antenna assembly, the phased array antenna assembly configured to receive a response signal. The system may also include a receiver unit configured to analyze the response signal and to identify the material to a user if the presence of the material is indicated by the resonance characteristics. The techniques described herein relate to a method for material detection and identification. The method may include configuring a transmit signal for parameters to detect a material; sending the transmit signal to a phase shifter; transmitting, using a phased array antenna assembly, an RF signal at a resonance frequency for the material; processing the response signal; and outputting an identification of the material.

8 Claims, 2 Drawing Sheets

(58) Field of Classification Search
CPC .... G01S 2013/0245; H01Q 3/36; H01Q 3/30; H01Q 3/04; H01Q 3/28
See application file for complete search history.

(56) References Cited

U.S. PATENT DOCUMENTS 3,851,971 A 12/1974 Koch
3,983,558 A 9/1976 Rittenbach
4,132,943 A 1/1979 Gournay et al.
4,217,585 A 8/1980 Fishbein et al.
4,296,378 A 10/1981 King
4,514,691 A 4/1985 De Los Santos et al.
4,897,660 A 1/1990 Gold et al.
5,227,800 A 7/1993 Huguenin et al.
5,233,300 A 8/1993 Buess et al.
5,592,083 A 1/1997 Magnuson et al.
5,745,071 A 4/1998 Blackmon et al.
5,757,001 A 5/1998 Burns
6,104,190 A 8/2000 Buess et al.
6,150,816 A 11/2000 Srinivasan
6,194,898 B1 2/2001 Magnuson et al.
6,297,765 B1 10/2001 Frazier et al.
6,359,582 B1 * 3/2002 MacAleese .............. G01V 3/12 342/197
6,822,444 B2 11/2004 Lai
6,847,208 B1 1/2005 Crowley et al.
6,900,633 B2 5/2005 Sauer et al.
6,967,612 B1 11/2005 Gorman et al.
7,180,441 B2 2/2007 Rowe et al.
7,218,105 B2 5/2007 Chisholm et al.
7,251,310 B2 7/2007 Smith
7,288,927 B2 10/2007 Nutting et al.
7,352,180 B2 4/2008 Manneschi
7,405,692 B2 7/2008 McMakin et al.
7,825,648 B2 11/2010 Nutting et al.
8,138,770 B2 3/2012 Pechmann et al.
8,188,862 B1 5/2012 Tam et al.
8,242,447 B1 8/2012 Chawla
8,242,450 B2 8/2012 Gaziano
8,502,666 B1 8/2013 Tam et al.
8,773,127 B2 7/2014 Apostolos et al.
8,890,745 B2 11/2014 Wahlquist et al.
9,182,481 B2 11/2015 Bowring et al.
9,500,609 B1 11/2016 Zank
9,857,462 B2 1/2018 Kim et al.
9,915,727 B1 3/2018 Reznack et al.
10,204,775 B2 2/2019 Brown et al.
10,229,328 B2 3/2019 Nikolova et al.
10,268,889 B2 4/2019 Brown et al.
10,816,658 B2 10/2020 Frizzell
10,890,656 B2 1/2021 Heinen
11,280,898 B2 3/2022 Morton
11,422,252 B2 * 8/2022 Bowring ................. G01S 7/417
11,493,494 B2 * 11/2022 Wilson ............... G01N 33/0057
12,248,062 B1 3/2025 Short et al.
12,360,234 B1 7/2025 Short et al.
12,372,480 B1 7/2025 Short et al.
12,379,439 B1 8/2025 Short et al.
12,386,037 B1 8/2025 Short et al.
12,451,217 B1 10/2025 Short, Jr. et al.
12,455,332 B1 10/2025 Short, Jr. et al.
12,517,066 B1 1/2026 Short, Jr. et al.
12,601,833 B2 4/2026 Short, Jr. et al.
12,613,331 B2 4/2026 Short, Jr. et al.
12,625,089 B2 5/2026 Short, Jr. et al.
2002/0008655 A1 1/2002 Haj-Yousef
2003/0001570 A1 1/2003 Buess et al.
2003/0196543 A1 10/2003 Moser et al.
2004/0039713 A1 2/2004 Beck
2004/0125020 A1 7/2004 Hendler et al.
2004/0155650 A1 8/2004 Plaas-Link et al.
2004/0232054 A1 11/2004 Brown et al.
2004/0252062 A1 12/2004 Tracy et al.
2005/0081634 A1 4/2005 Matsuzawa
2005/0104603 A1 5/2005 Peschmann et al.
2005/0200528 A1 9/2005 Carrender et al.
2005/0230604 A1 10/2005 Rowe et al.
2005/0258235 A1 11/2005 Silverbrook et al.
2006/0008051 A1 1/2006 Heaton et al.
2006/0038563 A1 2/2006 Chrisholm et al.
2006/0255798 A1 11/2006 Crowley et al.
2007/0074580 A1 4/2007 Fallah-Rad et al.
2007/0115183 A1 5/2007 Kim et al.
2007/0188377 A1 8/2007 Krikorian et al.
2008/0283761 A1 11/2008 Robinson et al.
2009/0039884 A1 2/2009 Schiano
2009/0085565 A1 4/2009 Fullerton
2009/0085582 A1 4/2009 Sinha
2009/0195435 A1 8/2009 Kapilevich et al.
2009/0222446 A1 9/2009 Goldschmidt et al.
2009/0262005 A1 10/2009 McNeill et al.
2010/0046704 A1 2/2010 Song et al.
2010/0079280 A1 4/2010 Lacaze et al.
2010/0128852 A1 5/2010 Yamamoto et al.
2010/0134102 A1 6/2010 Crowley
2010/0134254 A1 6/2010 Kim
2010/0164831 A1 7/2010 Rentz et al.
2010/0182594 A1 7/2010 Carron
2011/0050241 A1 3/2011 Nutting et al.
2011/0233419 A1 9/2011 Norris
2011/0284742 A1 11/2011 Barker et al.
2012/0206141 A1 8/2012 Apostolos et al.
2012/0248313 A1 * 10/2012 Karam ............... G01N 21/3581 250/336.1
2012/0256779 A1 10/2012 Nguyen et al.
2014/0050372 A1 2/2014 Qi et al.
2014/0154788 A1 6/2014 Omenetto et al.
2015/0160181 A1 6/2015 White et al.
2015/0250388 A1 * 9/2015 Arbabian ............... A61B 5/015 600/424
2015/0379356 A1 12/2015 Nikolova et al.
2016/0011307 A1 * 1/2016 Casse ................. H01Q 15/0086 701/93
2016/0047757 A1 2/2016 Kuznetsov et al.
2016/0124071 A1 5/2016 Baxley et al.
2016/0166843 A1 * 6/2016 Casse ..................... H01Q 21/08 607/100
2016/0178601 A1 6/2016 Harrison
2016/0195608 A1 7/2016 Ruenz
2016/0223666 A1 8/2016 Kim et al.
2016/0274230 A1 9/2016 Wu et al.
2016/0327634 A1 11/2016 Katz et al.
2017/0011255 A1 1/2017 Kaditz et al.
2017/0350834 A1 12/2017 Prado et al.
2018/0067204 A1 * 3/2018 Frizzell ................. G01S 13/887
2018/0285640 A1 10/2018 Brown et al.
2019/0137653 A1 5/2019 Starr et al.
2019/0154439 A1 5/2019 Binder
2019/0208112 A1 7/2019 Kleinbeck
2019/0219687 A1 7/2019 Baheti et al.
2019/0246185 A1 8/2019 Nespor et al.
2019/0257771 A1 8/2019 Desmulliez et al.
2020/0166634 A1 5/2020 Peleg
2020/0173970 A1 6/2020 Wilson et al.
2020/0264298 A1 * 8/2020 Haseltine ................. G01V 3/08
2020/0333412 A1 10/2020 Nichols et al.
2020/0371227 A1 11/2020 Malhi
2021/0041376 A1 2/2021 Ashiwal et al.
2021/0096240 A1 4/2021 Padmanabhan et al.
2021/0312201 A1 10/2021 Hastings et al.
2021/0373098 A1 12/2021 Fraundorfer et al.
2021/0389321 A1 12/2021 Kaushik et al.
2022/0011401 A1 1/2022 Dolgin et al.
2022/0171017 A1 6/2022 McFadden et al.
2022/0265882 A1 8/2022 Lemchen
2022/0311135 A1 * 9/2022 Guo ..................... H04B 7/0617
2022/0365168 A1 11/2022 Amizur et al.
2022/0408643 A1 12/2022 Somarowthu et al.
2023/0243761 A1 8/2023 Somarowthu et al.
2023/0260349 A1 8/2023 Hastings et al.
2023/0375695 A1 11/2023 Tan
2024/0036166 A1 2/2024 Geng et al.
2024/0288381 A1 8/2024 Stowell et al.
2024/0372600 A1 * 11/2024 Schreck ............... H04B 7/0456

(56) References Cited

U.S. PATENT DOCUMENTS

| | | | |
|---|---|---|---|
| 2025/0352907 | A1 | 11/2025 | Crabtree et al. |
| 2026/0009740 | A1 | 1/2026 | Short, Jr. et al. |
| 2026/0009741 | A1 | 1/2026 | Short, Jr. et al. |
| 2026/0009894 | A1 | 1/2026 | Short, Jr. et al. |
| 2026/0009895 | A1 | 1/2026 | Short, Jr. et al. |
| 2026/0009896 | A1 | 1/2026 | Short, Jr. et al. |
| 2026/0011201 | A1 | 1/2026 | Short, Jr. et al. |
| 2026/0011229 | A1 | 1/2026 | Short, Jr. et al. |
| 2026/0036658 | A1 | 2/2026 | Short, Jr. et al. |
| 2026/0043900 | A1 | 2/2026 | Short, Jr. et al. |
| 2026/0112458 | A1 | 4/2026 | Short, Jr. et al. |
| 2026/0160840 | A1 | 6/2026 | Short, Jr. et al. |
| 2026/0210876 | A1 | 7/2026 | Short, Jr. et al. |
| 2026/0210884 | A1 | 7/2026 | Short, Jr. et al. |
| 2026/0210885 | A1 | 7/2026 | Short, Jr. et al. |

FOREIGN PATENT DOCUMENTS

| | | | |
|---|---|---|---|
| EP | 2960685 | A2 | 12/2015 |
| JP | 2014095625 | | 5/2014 |
| WO | 2000075892 | A2 | 12/2000 |
| WO | WO 2024091157 | | 5/2024 |
| WO | PCT/US2024/039348 | | 7/2024 |
| WO | PCT/US25/36316 | | 7/2025 |
| WO | PCT/US25/36318 | | 7/2025 |
| WO | PCT/US25/36330 | | 7/2025 |
| WO | 2026010635 | A1 | 1/2026 |
| WO | 2026015361 | A1 | 1/2026 |

OTHER PUBLICATIONS

CN_107102325_A_I_translate.pdf (Year: 2017).*

U.S. Appl. No. 18/922,729, Non-Final Office Action dated Dec. 16, 2024.

U.S. Appl. No. 18/929,189, Non-Final Office Action dated Jan. 24, 2025.

U.S. Appl. No. 18/782,964, Non-Final Office Action dated Dec. 6, 2024.

U.S. Appl. No. 18/939,132, Non-Final Office Action dated Dec. 26, 2024.

U.S. Appl. No. 18/936,177, Non-Final Office Action dated Jan. 21, 2025.

U.S. Appl. No. 18/936,500, Non-Final Office Action dated Dec. 23, 2024.

U.S. Appl. No. 18/946,014, Non-Final Office Action dated Jan. 16, 2025.

Ibrahim et al., "A Subspace Signal Processing Technique for Concealed Weapons Detection," 2007 IEEE International Conference on Acoustics, Speech and Signal Processing—ICASSP '07, Honolulu, HI, USA, pp. II-401-II-404, doi: 10.1109/ICASSP.2007.366257, 2007.

Itozaki et al., "Nuclear Quadrupole Resonance for Explosive Detection," International Journal on Smart Sensing and Intelligent Systems, vol. 1, No. 3, Sep. 2008.

U.S. Appl. No. 18/921,840, Non-Final Office Action dated Feb. 28, 2025.

U.S. Appl. No. 18/938,584, Non-Final Office Action dated Feb. 24, 2025.

PCT Application No. PCT/US2025/036318, International Search Report and Written Opinion dated Aug. 26, 2025.

U.S. Appl. No. 18/946,014, Final Office Action dated Sep. 10, 2025.

U.S. Appl. No. 18/923,518, Non-Final Office Action dated Nov. 19, 2025.

U.S. Appl. No. 18/921,840, filed Oct. 21, 2024, US, Robert J. Short Jr., RF-Based Material Detection Device that Uses Specific Antennas Designed for Specific Substances.

U.S. Appl. No. 18/922,682, filed Oct. 22, 2024, US, Robert J. Short Jr., Enhanced Antenna Materials for Low-Frequency Detection of Materials.

U.S. Appl. No. 18/923,518, filed Oct. 22, 2024, US, Robert J. Short Jr., Currency RF-Based Verification Device.

U.S. Appl. No. 18/922,702, filed Oct. 22, 2024, US, Robert J. Short Jr., Enhanced Material Detection and Frequency Sweep Analysis of Controlled Substances VIA Digital Signal Processing.

U.S. Appl. No. 18/922,729, filed Oct. 22, 2024, US, Robert J. Short Jr., RF-based Detection Device for Material Identification Using a Smart Frequency Selection Method.

U.S. Appl. No. 18/929,189, filed Oct. 28, 2024, US, Robert J. Short Jr, RF-Specific Material Detection Device for an Application-Specific Device.

U.S. Appl. No. 18/782,964, filed Jul. 24, 2024, US, Robert J. Short Jr., RF-Based Material Identification Systems and Methods.

U.S. Appl. No. 18/934,569, filed Nov. 1, 2024, US, Robert J. Short Jr., Networked RF Material Devices for Substance Detection VIA Opposed Perimeter Sensors.

U.S. Appl. No. 18/939,132, filed Nov. 1, 2024, US, Robert J. Short Jr., RF Material Detection Device with Smart Scanning Multiple Axis Gimbal Integrated with Haptics.

U.S. Appl. No. 18/938,584, filed Nov. 6, 2024, US, Robert J. Short Jr., RF Transmit and Receiver Antenna Detector System.

U.S. Appl. No. 18/936,177, filed Nov. 4, 2024, US, Robert J. Short Jr., Method and System for Detecting and Quantifying Specific Substances, Elements, or Conditions Utilizing an AI Module.

U.S. Appl. No. 18/942,906, filed Nov. 11, 2024, US, Robert J. Short Jr., RF-Specific Material Detection Device Integrated Into Applcation-Specific Drone Device.

U.S. Appl. No. 18/936,500, filed Nov. 4, 2024, US, Robert J. Short Jr., RF-Based Special Material Detection System with Secure Multi-Dimensional Authentication.

U.S. Appl. No. 18/938,691, filed Nov. 6, 2024, US, Robert J. Short Jr., RF-Based AI Determination of Materials by Cycling Through Detection Patterns for Specific Applications.

U.S. Appl. No. 18/946,014, filed Nov. 13, 2024, US, Robert J. Short Jr., RF-Based Special Material Detection Securing Entry Points and Access.

U.S. Appl. No. 18/929,189, Final Office Action dated Jun. 23, 2025.

U.S. Appl. No. 19/268,204, Non-Final Office Action dated Aug. 13, 2025.

U.S. Appl. No. 19/279,049, Non-Final Office Action dated Aug. 22, 2025.

PCT Application No. PCT/US2024/039348, International Search Report and Written Opinion dated Oct. 17, 2024.

U.S. Appl. No. 19/074,744, filed Mar. 10, 2025, US, Robert J. Short Jr., Enhanced Material Detection and Frequency Sweep Analysis of Controlled Substances VIA Digital Signal Processing.

U.S. Appl. No. 19/296,137, filed Aug. 11, 2025, US, Robert J. Short Jr., RF Based Detection Device for Material Identification Using a Smart Frequency Selection Method.

U.S. Appl. No. 19/268,204, filed Jul. 14, 2025, US, Robert J. Short Jr., RF-Based Material Identification Systems and Methods.

U.S. Appl. No. 19/290,051, filed Aug. 4, 2025, US, Robert J. Short Jr., RF Material Detection Device with Smart Scanning Multiple Axis Gimbal Integrated with Haptics.

U.S. Appl. No. 19/370,609, filed Oct. 27, 2025, US, Robert J. Short Jr., RF Transmit and Receiver Antenna Detector System.

U.S. Appl. No. 19/364,892, filed Oct. 21, 2025, US, Robert J. Short Jr., Method and System for Detecting and Quantifying Specific Substances, Elements, or Conditions Utilizing and AI Module.

U.S. Appl. No. 19/279,049, filed Jul. 24, 2025, US, Robert J. Short Jr., RF-Based Special Material Detection System with Secure Multi-Dimensional Authentication.

U.S. Appl. No. 18/923,518, Final Office Action dated Mar. 20, 2026.

U.S. Appl. No. 19/441,480, filed Jan. 6, 2026, Robert J. Short Jr., RF-Based Material Detection Device that uses Specific Antennas Designed for Specific Substances.

U.S. Appl. No. 18/938,691, Non-Final Office Action dated Jun. 25, 2026.

U.S. Appl. No. 18/934,569, Non-Final Office Action dated May 27, 2026.

U.S. Appl. No. 18/923,518, Non-Final Office Action dated Jul. 29, 2026.

(56) References Cited

OTHER PUBLICATIONS

U.S. Appl. No. 18/946,014, Non-Final Office Action dated Jul. 31, 2026.

* cited by examiner

DYNAMIC PHASED ARRAY RESONATOR SYSTEMS AND METHODS FOR DETERMINING A MATERIAL SUBSTANCE

CROSS-REFERENCE TO RELATED APPLICATION

This application claims the benefit of U.S. Provisional Application No. 63/667,561, filed Jul. 3, 2024, for DYNAMIC PHASED ARRAY RESONATOR OPTIMIZATION SYSTEM FOR DETERMINING A MATERIAL SUBSTANCE, which is incorporated herein by reference.

FIELD OF THE DISCLOSURE

The present disclosure is generally related to a dynamic phased array antenna resonator optimization system.

BACKGROUND

Typical detection methods cannot precisely target specific signal sources, resulting in diminished accuracy and potential interference from irrelevant signals. Standard systems often face challenges in optimizing signal detection and emission efficiency, particularly when dealing with diverse signal characteristics across different environments. Also, existing detection technologies are hindered by fixed configurations that cannot dynamically adapt to changing signal conditions, limiting their effectiveness in variable environments. Traditional systems cannot dynamically enhance signal clarity, which is important for accurately detecting and interpreting weak or complex signals. Lastly, managing phase adjustments and positioning controls for signal optimization is often complex and cumbersome, reducing the system's overall responsiveness and adaptability. Current signal detection and emission systems are not versatile enough to be effectively applied across a wide range of applications with high precision and dynamic adaptability. Thus, there is a need to provide a dynamic phased array antenna resonator optimization system.

SUMMARY

Embodiments include a method of dynamically optimizing signal reception and emission in a device through an array of small, independently positioned resonators or antennas. This system leverages the concept of phase array antenna technology, allowing the configuration and shape of the resonator antenna array to be dynamically altered to improve performance for specific signal characteristics. Each resonator antenna in the array can be directed to target a particular signal source or to enhance signal clarity, thereby improving the overall efficiency and accuracy of signal detection and emission. The implementation of this technology involves the use of phase adjustments and positioning controls for each resonator within the array, facilitating a versatile approach to signal management. This method is particularly applicable in environments where signal properties are variable or in applications requiring high precision in signal discrimination.

Some aspects relate to a system for material detection and identification. The system includes a transmitter unit configured to transmit into an environment an RF signal at a resonance frequency for a material; a phased array antenna assembly including a phase array element tuned for a resonance frequency, the phased array antenna assembly configured to receive a response signal from the environment for the RF signal; and a receiver unit configured to analyze the response signal for resonance characteristics that indicate a presence of the material and identifying the material to a user if the presence of the material is indicated by the resonance characteristics.

In some aspects, systems further include a support frame including non-ferrous material configured to house the phased array antenna assembly.

In some aspects, systems further include a plurality of radiating elements, wherein each radiating element has an adjustable phase and an adjustable amplitude, and where the phase array element is a beamforming network configured to adjust phase and amplitude of each radiating element.

In some aspects, systems further include a phase shifter, where the beamforming network is configured with a dynamic phase adjustment algorithm, and where the phase shifter tunes to focus on the resonance frequency according to the dynamic phase adjustment algorithm.

In some aspects, in the system, the beamforming network is configured with a machine learning system that adjusts beam directions to increase signal strength at the resonance frequency.

In some aspects, systems further include a control panel configured with automated calibration software, and where the beamforming network and the phased array antenna are configured to be adjusted by the automated calibration software.

In some aspects, systems further include a plurality of phase shifters configured to adjust a phase angle of the RF signal.

In some aspects, systems further include a plurality of phase shifters configured to adjust a phase angle of the response signal.

In some aspects, systems further include an interface configured to allow a user to instruct the system to transmit, using the transmitter unit, the RF signal at the resonance frequency and to receive, at the receiver unit, the response signal.

In some aspects, the techniques described herein relate to a method for material detection and identification, the method includes configuring, using a transmitter unit, a transmit signal for parameters to detect a material. The method may also include sending, using the transmitter unit, the transmit signal to a phase shifter. The method may further include transmitting, using a phased array antenna assembly, an RF signal at a resonance frequency for the material. Transmitting may include the phase shifter adjusting the phased array antenna assembly to transmit in a direction of the material. The method may also include receiving, using the phased array antenna assembly, a response signal from the environment. Additionally, the method may include processing, using a receiver unit, the response signal for resonance characteristics that indicate a presence of the material. The method may include outputting, using the receiver unit, an identification of the material when the resonance characteristics indicate the presence of the material.

In some aspects, the techniques described herein relate to a method, further including: accessing a material database associating each of a plurality of materials with one or more corresponding resonance frequencies.

In some aspects, the techniques described herein relate to a method, where adjusting the phased array antenna assembly includes adjusting a phase of a signal at each antenna element of a plurality of antenna elements of the phased array antenna assembly to combine signals constructively in the direction.

In some aspects, the techniques described herein relate to a method, where adjusting the phased array antenna assembly includes adjusting an amplitude of a signal at each antenna element of a plurality of antenna elements of the phased array antenna assembly to combine signals constructively in the direction.

In some aspects, the techniques described herein relate to a method, further including creating destructive interference using the phased array antenna assembly.

In some aspects, the techniques described herein relate to a method, further including aligning an opening of a directional shield in the direction of the material.

In some aspects, the techniques described herein relate to a method, further including scanning, using the phased array antenna assembly, a field of view of 30 to 180 degrees, where the field of view includes the direction of the material.

In some aspects, the techniques described herein relate to a method, where the material is an explosive.

In some aspects, the techniques described herein relate to a method, where adjusting the phased array antenna assembly includes adjusting beam directions, using a machine learning system, to increase signal strength at the resonance frequency.

In some aspects, the techniques described herein relate to a method, where processing the response signal includes comparing signal strengths at a plurality of frequencies for the material.

In some aspects, the techniques described herein relate to a method, where processing the response signal includes inputting the response signal into a machine learning model trained to recognize patterns between the material and resonance characteristics that indicate the presence of the material.

DETAILED DESCRIPTION

Embodiments of the present disclosure are described hereinafter with reference to the accompanying drawings in which like numerals represent like elements throughout the several figures and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
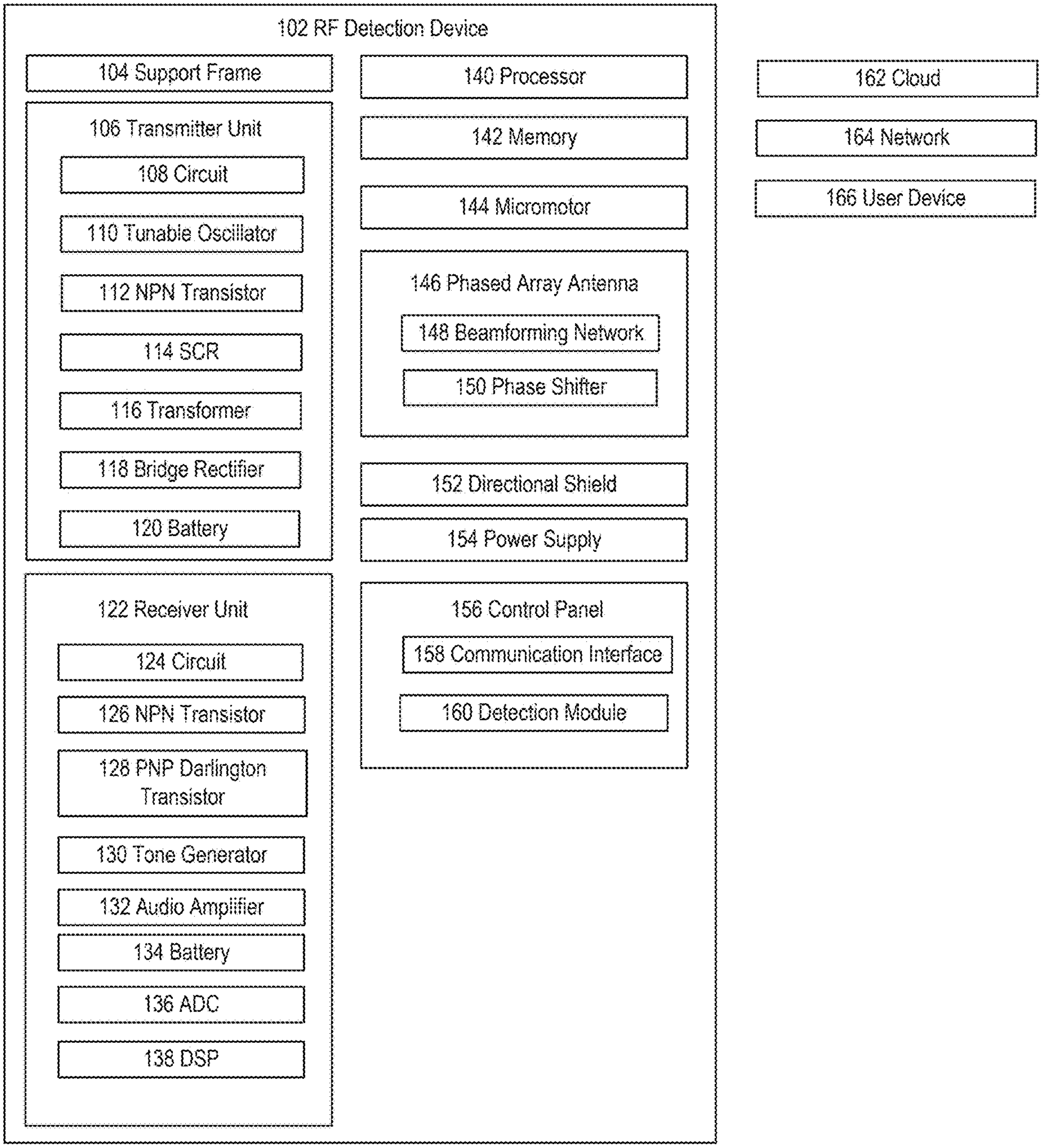
FIG. 1 shows a dynamic phased array resonator optimization system for determining a material substance according to an embodiment.

FIG. 1 illustrates a system for dynamic phased array resonator optimization system for determining a material substance. This system includes an RF detection device 102, which may be a specialized system designed to detect and identify specific materials based on their unique resonance frequencies when exposed to electromagnetic signals. The RF detection device 102 may incorporate an RF detection system similar to that disclosed in patent U.S. Pat. No. 11,493,494 B2, the entire contents of which are incorporated herein by reference for all purposes. The RF detection system may employ RF signals for the detection and identification of materials based on their resonance characteristics. The RF detection device 102 may operate by transmitting RF signals into the environment and analyzing the received signals for resonance characteristics that indicate the presence of a target material. The RF detection device 102 may be designed to detect a target material based on its resonance properties with specific RF frequencies. It utilizes the principle that materials resonate at particular frequencies when exposed to external RF signals, allowing for their identification and potential quantification. The RF detection device 102 may include a transmitter unit 106, a receiver unit 122, a control panel 156, a phased array antenna 146, a directional shield 152, and a power supply 154. Upon activation, the control panel 156 may initialize the system, powering up the transmitter unit 106, the receiver unit 122, and associated electronics. The control panel 156 may instruct the transmitter unit 106 to generate RF signals at specified frequencies, such as 180 Hz, 1800 Hz, etc., and amplitudes, such as 320V, 160V, etc., known to or determined to resonate with a target material. The transmitter unit 106 emits these RF signals through the phased array antenna 146 into the testing environment. The receiver unit 122 captures the RF signals using the phased array antenna 146. It then processes the received signals to identify resonance frequencies that indicate the presence of the target material.

Further, embodiments may include a support frame 104, which may be a structural component designed to provide stability and support to various subsystems and components of the RF detection device 102. The support frame 104 may provide proper alignment and positioning of the components, such as the transmitter unit 106, the receiver unit 122, phased array antennas 146, and control panel 156. The support frame 104 may provide mounting points and secure attachment locations for subsystems such as the transmitter unit 106, the receiver unit 122, phase array antennas 146, and control panel 156. By maintaining precise alignment and stability, the support frame 104 may minimize vibrations and unwanted movements that may interfere with the accuracy of RF signal transmission and reception. In some embodiments, the support frame 104 may be constructed from durable materials such as metal alloys or rigid polymers.

Further, embodiments may include a transmitter unit 106, which may include an electronic circuit 108, powered by a battery, such as a 12-volt, 1.2 amp battery, with a regulated output of nine volts. The circuit 108 may use a 555 timer as a tunable oscillator to generate a pulse rate. The output of the oscillator may be fed in parallel to an NPN transistor 112 and a silicon-controlled rectifier (SCR) 114. The transistor may be used as a common emitter amplifier stage driving a transformer 116. The transformer 116 may be used to step up the voltage as needed. The balanced output of the transformer 116 feeds a bridge rectifier 118. The rectified direct current may flow through a 100 K, three-watt resistor to terminal B of the phased array antenna 146. A plurality of resistors and capacitors may fill in the circuit 108. The SCR 114 may be "fired" by the output of the 555 timer. This particular configuration generates a narrow-pulsed waveform to the phased array antenna 146 at a pulse rate as set by the 555 timer. Power may be delivered through the 3 W resistor. Frequencies down to 4 Hz may be achieved by an RC network containing a 100 K pot, a switch, and one of two capacitive paths. The circuit 108 may provide simple RC-controlled timing and deliver pulses to the primary of a step-up transformer 116, the output of which is full-wave rectified and fed to the phased array antenna 146. The pulse rate is adjustable from the low Hz range to the low kHz range. The sharp pulses at low repetition frequencies may yield a wide spectrum of closely spaced lines. The pulse rate may be adjusted depending on the material to be detected.

In some embodiments, one or more portions of the transmitter unit 106 may be implemented in an analog circuit configuration, a digital circuit configuration, or some combination thereof. In one example, the analog configuration may include one or more analog circuit components, such as, but not limited to, operational amplifiers, op-amps, resistors, inductors, and capacitors. In another example, the digital configuration may include one or more digital circuit components, such as, but not limited to, microprocessors, logic gates, and transistor-based switches. In some instances, a given logic gate may include one or more electronically controlled switches, such as transistors, and the output of a first logic gate may control one or more logic gates disposed "downstream" from the first logic gate. In some embodiments, depending on the phased array antenna's 146 requirements, such as frequency, power level, and waveform, the transmitter unit 106 can accommodate different configurations. For example, it may adjust parameters like frequency modulation to align precisely with the resonant frequency of the target material being detected by the antenna. In some embodiments, the tunable oscillator 110 may be capable of fine-tuning the frequency to match the specific detection needs to provide that the signal sent to the phased array antenna 146 is precise. In some embodiments, the NPN transistor 112 and SCR 114 may be adjusted for handling higher power and precision control, respectively. In some embodiments, the transformer 116 and bridge rectifier 118 may facilitate a stable power supply, with the battery 120 providing consistent energy, especially when the phased array antenna's 146 beamforming capabilities are active.

Further, embodiments may include a circuit 108, which may be an assembly of electronic components that generate, modulate, and transmit radio frequency, RF, and signals. The circuit 108 may include oscillators, amplifiers, modulators, and other components that work together to produce a specific RF signal, which can then be transmitted through the phased array antenna 146. The circuit 108 may include an oscillator, which generates a stable RF signal at a specified frequency. This frequency may be based on the resonance characteristics of the target material. For example, the system may operate at 180 Hz or 1800 Hz, depending on the specific requirements of the detection task. Once generated, the RF signal may be fed into an amplifier. The amplifier may boost the signal strength to a level suitable for transmission over a given distance. The signal may propagate through various media and reach the receiver unit effectively. Modulation circuits may be used to encode information into the RF signal. This may involve varying the amplitude, frequency, or phase of the signal to carry specific data related to the detection process. Modulation provides that the transmitted signal can be uniquely identified and distinguished from other signals in the environment. The circuit 108 may include power control components that regulate the voltage and current supplied to the oscillator and amplifier. This provides consistent signal output and helps in managing the power consumption of the device. In some embodiments, the transmitter may operate at voltages such as 160V and 320V, with adjustments made to optimize detection performance. The amplified and modulated RF signal may then routed be to the phased array antenna 146. In some embodiments, the circuit 108 may be integrated with the device's control systems, allowing for automated adjustments based on pre-set parameters or operator inputs.

Further, embodiments may include a tunable oscillator 110, which may be a type of electronic component that generates a periodic waveform with a frequency that can be adjusted or tuned over a specific range. The tunable oscillator 110 within the transmitter unit 106 may be utilized to generate the RF signal that will be transmitted by the RF detection device 102. The tunable oscillator 110 in the transmitter unit 106 may be employed to produce an RF signal whose frequency can be precisely controlled. The frequency of the output signal can be varied by adjusting the control inputs, allowing the system to adapt to different detection and environmental conditions. This tuning mechanism may provide that the oscillator produces a signal at a correct frequency useful for effective resonance with the target materials. By tuning the oscillator to specific frequencies, the system may detect various substances based on their unique resonant properties. The tunable oscillator 110 may work in conjunction with the control panel 156, which sends control signals to adjust the oscillator's frequency. The tunable oscillator 110 may act as the core signal generation component in the transmitter unit 106. When the control panel 156 determines the frequency for detection, control panel 156 sends control signals to the tunable oscillator 110. The oscillator may then adjust its frequency accordingly, generating an RF signal that matches the desired parameters. The tunable oscillator 110 may be connected to other components within the transmitter unit 106, such as the SCR 114 and the transformer 116. The SCR 114 manages the power supply to the oscillator, ensuring it receives the correct voltage. The transformer 116 steps up the voltage to a level sufficient for the oscillator.

Further, embodiments may include an NPN transistor 112, which may be a type of bipolar junction transistor, BJT, that includes three layers of semiconductor material: a layer of p-type material, the base layer, sandwiched between two layers of n-type material, the emitter and the collector. When a small current flows into the base, the small current allows a larger current to flow from the collector to the emitter, effectively acting as a current amplifier or switch in electronic circuits. The NPN transistor 112 in the transmitter unit 106 amplifies the RF signal generated by the oscillator. The NPN transistor 112 may operate in its active region, where a small input current applied to the base controls a larger current flowing from the collector to the emitter. This amplification process provides that the RF signal reaches a sufficient power level for effective transmission. In some embodiments, the NPN transistor 112 may also function as a switch, controlling the flow of current within the circuit 108. When the base-emitter junction is forward-biased, a small voltage is applied, and the NPN transistor 112 allows current to flow from the collector to the emitter. This switching action is used to modulate the RF signal, encoding information onto the carrier wave for the detection process. Proper biasing of the NPN transistor 112 is useful for stable operation. In some embodiments, resistors may be used to establish the biasing conditions preferrable for the NPN transistor 112 operating in its linear region for amplification or in saturation/cutoff regions for switching. The biasing circuit facilitates the NPN transistor 112 responding predictably to input signals, maintaining signal integrity. In some embodiments, the NPN transistor 112 may be involved in modulating the RF signal. By varying the input current to the base, the amplitude, frequency, or phase of the RF signal can be modulated. This modulation is useful for encoding the detection data onto the transmitted signal, allowing for more accurate and improved chemical identification and analysis. In some embodiments, the NPN transistor 112 may be integrated into the broader transmitter circuit 108, working in conjunction with other components such as capacitors, inductors, and resistors. This integration provides that the NPN transistor's 112 amplification and switching actions are synchronized with the overall signal generation and transmission process. The circuit 108 design may leverage the NPN transistor's 112 properties to achieve the desired RF output characteristics.

Further, embodiments may include an SCR 114 or silicon-controlled rectifier, which may be a type of semiconductor device that functions as a switch and rectifier, allowing current to flow only when a control voltage is applied to its gate terminal. The silicon-controlled rectifier, SCR 114, is utilized within the transmitter unit 106 to manage and control the power delivery to the RF signal generation components. The SCR 114 in the transmitter unit 106 may be employed to control the flow of power to the RF oscillator circuit. By applying a gate signal to the SCR 114, SCR 114 switches from a non-conductive state to a conductive state, allowing current to pass through and power the oscillator. This control mechanism provides that the oscillator only receives power when desired, thereby conserving energy and preventing unnecessary power dissipation. The SCR 114 may act as a switching element in the transmitter unit 106. When the control panel 156 determines that the RF signal needs to be generated, a gate voltage is applied to the SCR 114. This triggers the SCR 114 to conduct, completing the circuit and enabling current to flow to the RF oscillator. The SCR 114 may facilitate that sufficient current is supplied to the oscillator to produce a strong RF signal without being damaged by the high power levels. The gate terminal of the SCR 114 may be connected to the control panel 156, which manages the timing and application of the gate signal. This integration provides that the SCR 114 is activated precisely when the RF signal needs to be transmitted, in sync with the overall operation of the detection system. The control panel 156 sends the appropriate signal to the SCR 114, ensuring accurate timing and efficient power usage. The SCR 114 may also serve as a protective component in the transmitter unit 106. By controlling the power flow, SCR 114 prevents overloading and potential damage to the RF oscillator and other sensitive components. If the system detects any abnormal conditions, the control panel 156 can withhold the gate signal, keeping the SCR 114 in a non-conductive state and thereby cutting off power to protect the circuit.

Further, embodiments may include a transformer 116, which is an electrical device that transfers electrical energy between two or more circuits through electromagnetic induction. The transformer 116 is utilized within the transmitter unit 106 to manage and control the voltage levels for the RF signal generation and transmission. The transformer 116 in transmitter unit 106 may be employed to step up or down the voltage as needed to facilitate the proper operation of the RF oscillator circuit. By adjusting the voltage levels, the transformer 116 provides that the components within the transmitter unit receive the appropriate voltage for efficient functioning. The transformer 116 may act as a voltage regulation element in the transmitter unit 106. When the control panel 156 determines that the RF signal needs to be generated, the transformer 116 adjusts the input voltage to the desired level. This adjustment involves converting the primary winding voltage to a higher or lower voltage in the secondary winding, depending on the requirements of the RF oscillator. The transformer 116 provides that the oscillator receives a stable and appropriate voltage, which is critical for producing a consistent and strong RF signal. The primary winding of the transformer 116 may be connected to the power supply 154, while the secondary winding is connected to the RF oscillator circuit. This integration provides that transformer 116 can effectively manage the voltage levels needed for RF signal generation. The control panel 156 monitors and regulates the input voltage to the transformer 116, ensuring accurate and efficient voltage conversion and delivery to the RF oscillator.

Further, embodiments may include a bridge rectifier 118, which is an electrical device designed to convert alternating current, AC, to direct current, DC, using a combination of four diodes arranged in a bridge configuration. The bridge rectifier 118 is utilized within the transmitter unit 106 to facilitate that the RF signal generation components receive a steady and reliable DC power supply. The bridge rectifier 118 in the transmitter unit 106 may be employed to convert the incoming AC voltage from the power supply into a DC voltage. By using all portions of the AC waveform, the bridge rectifier 118 may provide full-wave rectification, resulting in a more efficient conversion process and producing a smoother and more stable DC output. The bridge rectifier 118 may act as a power conversion element in the transmitter unit 106. When the control panel 156 determines that the RF signal needs to be generated, the AC voltage supplied to the transmitter unit is passed through the bridge rectifier 118. The rectifier converts the AC voltage into a DC voltage by directing the positive and negative halves of the AC waveform through the appropriate diodes. This process results in a continuous DC voltage output that is used to power the RF oscillator and other critical components. The input terminals of the bridge rectifier 118 may be connected to the AC power supply, while the output terminals provide the rectified DC voltage to the RF oscillator circuit. This integration provides that the bridge rectifier 118 can effectively convert and deliver the DC power for RF signal generation. The control panel 156 monitors the output of the bridge rectifier, providing that the DC voltage is stable and within the desired range for optimal performance.

Further, embodiments may include a battery 120, which may be a type of energy storage device that provides a stable and portable power source for the transmitter unit 106. The battery 120 within the transmitter unit 106 may be utilized to supply the electrical energy to the various components involved in generating and transmitting the RF signal. The battery 120 may be designed to store electrical energy and supply it to the respective components. The battery 120 may be rechargeable or replaceable cells capable of providing DC voltage. They are selected based on factors such as voltage output and capacity, which may be measured in ampere-hours, Ah, and size to meet the power requirements of each component effectively. In the transmitter unit 106, battery 120 may serve as a portable power source, enabling the generation and transmission of RF signals without requiring a direct connection to an external power supply. The battery 120 powers components such as the oscillator circuit 108, SCR 114, and transformer 116, facilitating continuous operation in various environmental conditions. In some embodiments, the battery 120 used may include lithium-ion, nickel-metal hydride, or other types suitable for portable electronic devices.

Further, embodiments may include a receiver unit 122, which may convert the incoming RF signals into a format that can be analyzed to detect the presence of specific hazardous materials accurately. The receiver unit 122 may operate by capturing the signals through the phased array antenna 146, amplifying and filtering these signals, converting them into digital form, and processing them to extract relevant information. The phased array antenna 146 receives the responded signals from the target materials, which may be initially weak and may contain noise. The receiver unit may amplify and filter the received signals. The received signals are fed into circuit 124, which serves as the primary signal pathway within the receiver unit 122. The NPN transistor 126 in the receiver unit acts as a first-stage amplifier, boosting the strength of the incoming signals without significantly altering their characteristics. This amplification enhances the signal-to-noise ratio, making it easier to process the signals further. Following the initial amplification, the signals are passed to the PNP Darlington transistor 128, which provides additional amplification with high current gain.

The analog signals are directed to the Analog-to-Digital Converter or ADC 136. The ADC 136 may convert the continuous analog signals into discrete digital data that can be processed by digital systems. The ADC 136 samples the incoming signals at a high rate and quantifies them into digital values, preserving characteristics of the original analog signals. The digitized signals from the ADC 136 may then be sent to the Digital Signal Processor or DSP 138. The DSP 138 may perform various complex signal-processing tasks, such as filtering, demodulation, noise reduction, and feature extraction. In some embodiments, the DSP may apply advanced algorithms to enhance the quality of the received signals and extract meaningful information related to the target materials. For example, the DSP 138 might identify specific frequency patterns corresponding to hazardous substances and provide data on their presence and concentration. The processed data from the DSP 138 may be transmitted to the control panel 156, where it is analyzed further. The control panel 156 uses the data to make decisions about the presence and location of hazardous materials, triggering alerts, logging detection events, or initiating additional actions. In some embodiments, the circuit 124 may be enhanced to handle the phased array's advanced signal processing needs. In some embodiments, the NPN transistor 126 and PNP Darlington transistor 128 may be optimized for high sensitivity and low noise for detecting weak signals. In some embodiments, the ADC 136 and DSP 138 may be high-performance units capable of handling the complex signal processing sufficient for the phased array.

Further, embodiments may include a circuit 124 within the receiver unit 122, which may be an assembly of electrical components designed to process the received RF signal. The circuit 124 may accurately interpret the RF signals responded or emitted from the target substances and convert them into data that can be analyzed by the RF detection device 102. The circuit 124 in the receiver unit 122 may be employed to handle signal amplification, filtering, demodulation, and signal processing. When an RF signal is received via the phased array antenna 146, the signal is typically weak and may contain noise or interference. The first stage of the circuit 124 may involve an amplifier that boosts the signal strength to a level suitable for further processing. This amplification provides that even weak signals can be analyzed effectively. Next, the circuit 124 may include filtering components that serve to remove unwanted frequencies and noise from the received signal. Filters provide that only the relevant frequency components of the RF signal are passed through, enhancing the signal-to-noise ratio and improving the clarity of the data. The circuit 124 may also incorporate a demodulator, which extracts the original information-bearing signal from the modulated RF carrier wave. This step interprets the data encoded in the RF signal, allowing the system to identify specific characteristics or signatures of the target substances. In some embodiments, the circuit 124 may include various signal processing components, such as analog-to-digital converters and ADCs 136, which convert the analog RF signal into digital data. This digital data may then be processed by the DSP 138, the control panel 156, or other computational units within the system for detailed analysis. The signal processing may involve algorithms to detect specific patterns, frequencies, or anomalies that indicate the presence of target materials. The components within the circuit 124 interact seamlessly to provide accurate and efficient signal processing. For example, the amplified signal from the amplifier is passed to the filter, which cleans up the signal before it reaches the demodulator. The demodulated signal is then digitized by the ADC 136 and sent to the control panel 156 for analysis.

Further, embodiments may include an NPN transistor 126, which may be a three-terminal semiconductor device used for amplification and switching of electrical signals. The NPN transistor 126 may include three layers of semiconductor material: a thin middle layer, or base, between two heavily doped layers, or emitter and collector. The NPN transistor operates by controlling the flow of current from the collector to the emitter, regulated by the voltage applied to the base terminal. The NPN transistor 126 integrated into the receiver unit 122 may be designed to process incoming RF signals and may operate in a configuration where the base-emitter junction is forward-biased by a small control voltage provided by the preceding stages of the circuit. The collector of the NPN transistor 126 may be connected to the circuit's supply voltage through a load resistor. When a small current flows into the base terminal, the small current allows a larger current to flow from the collector to the emitter. This amplification process increases the strength of the received signal, enabling subsequent stages of the circuit to process it more effectively. In the receiver unit 122, the NPN transistor 126 may be employed within amplifier stages where signal gain is useful. By controlling the base current, the circuit can modulate the transistor's conductivity and thereby regulate the amplification factor. This capability enhances weak RF signals received by the antenna and prepares them for further processing. In some embodiments, the NPN transistor 126 may be utilized in conjunction with capacitors and resistors to form amplifier circuits tailored to the specific requirements of the RF detection device 102. Capacitors may be used to couple AC signals while blocking DC components, ensuring that only the RF signal is amplified. Resistors set the biasing and operating points of the transistor, optimizing its performance within the circuit.

Further, embodiments may include a PNP Darlington transistor 128, which may be a semiconductor device including two PNP transistors connected in a configuration that provides high current gain. The PNP Darlington transistor 128 integrates two stages of amplification in a single package, where the output of the first transistor acts as the input to the second, significantly boosting the overall gain of the circuit. The PNP Darlington transistor 128 amplifies weak RF signals received by the phased array antenna 146. The incoming RF signal is fed into the base of the first PNP transistor within the Darlington pair. The PNP Darlington transistor 128, due to its high current gain, allows a much larger current to flow from its collector to the emitter compared to the base current. The output from the collector of the first transistor serves as the input to the base of the second PNP transistor in the Darlington pair. The second PNP transistor further amplifies the signal received from the first stage, again with significant current gain.

Further, embodiments may include a tone generator 130, which may be a type of electronic device that produces audio signals or tones to alert the user of specific conditions. The tone generator 130 within the receiver unit 122 is utilized to generate audible alerts when the detection system identifies the presence of target materials. The tone generator 130 in the receiver unit 122 may be employed to create specific tones that serve as audible indicators for the user. By generating these tones, the tone generator 130 provides immediate feedback to the operator, signaling the detection of target materials in real time. The tone generator 130 may provide that the operator is promptly informed of detections without needing to constantly monitor visual displays. The tone generator 130 produces distinct sounds that correspond to different detection events, making it easier for the operator to understand the system's status and respond accordingly. The tone generator 130 may act as a critical alerting component within the receiver unit 122. When the control panel 156 determines that the RF signal corresponds to a detected target material, it sends a signal to the tone generator 130. This triggers the tone generator 130 to produce a sound, alerting the operator to the detection event.

Further, embodiments may include an audio amplifier 132, which may be a type of electronic device designed to increase the amplitude of audio signals. The audio amplifier 132 within the receiver unit 122 may be utilized to boost the audio signals generated by the tone generator 130, such that the output sound is sufficiently loud and clear for the operator to hear. The audio amplifier 132 in the receiver unit 122 may be employed to enhance the volume and clarity of the audio tones produced by the tone generator 130. By amplifying these audio signals, the audio amplifier 132 provides that the operator receives audible alerts even in noisy environments, thus improving the overall effectiveness of the detection system. The audio amplifier 132 may act as an intermediary component between the tone generator 130 and the output device, such as a speaker. When the tone generator 130 produces an audio signal, this signal is sent to the audio amplifier 132. The amplifier then boosts the signal's power, making it strong enough to drive the speaker and produce an audible sound. The audio amplifier 132 is connected to other components within the receiver unit 122, including the tone generator 130 and the speaker. It receives the low-power audio signals from the tone generator 130 and amplifies them to a level suitable for driving the speaker.

Further, embodiments may include a battery 134, which may be a type of energy storage device that provides a stable and portable power source for the receiver unit 122. The battery 134 within the receiver unit 122 may be utilized to supply the electrical energy to the various components involved in generating and transmitting the RF signal. The battery 134 may be designed to store electrical energy and supply it to the respective components. The battery 134 may be rechargeable or replaceable cells capable of providing DC voltage. They are selected based on factors such as voltage output and capacity, which may be measured in ampere-hours, Ah, and size to meet the power requirements of each component effectively. In the receiver unit 122, batteries provide sufficient electrical energy to receive and process RF signals detected by the antenna. The battery 134 may power components such as amplifiers, filters, and signal processing circuitry, enabling the device to analyze incoming RF signals and extract relevant information. In some embodiments, the battery 134 may include lithium-ion, nickel-metal hydride, or other types suitable for portable electronic devices.

Further, embodiments may include an analog-to-digital converter, or ADC 136, which may be an electronic device that converts continuous analog signals into discrete digital numbers. The process of conversion involves sampling the analog signal at regular intervals and quantizing the signal amplitude to a finite set of levels. The ADC 136 may be integrated into the receiver unit 122 and may be responsible for converting the amplified and filtered analog signals received from the phased array antenna 146 into digital data that can be processed by the DSP 138. For example, when the RF detection device 102 is activated, the phased array antenna 146 transmits a signal that interacts with the target materials. The responded signals, carrying information about the presence and properties of the target materials, are captured by the antenna elements and sent to the receiver unit 122. These incoming analog signals are first amplified to boost their strength and then filtered to remove any noise or unwanted frequencies, providing that the signals of interest are isolated and enhanced. The amplified and filtered analog signals are then fed into the ADC 136. The ADC 136 samples the analog signals at a high rate, converting each sample into a corresponding digital value. During sampling, the ADC 136 takes snapshots of the analog signal amplitude at regular intervals, known as the sampling rate. The accuracy of the ADC 136 may depend on its resolution, which is determined by the number of bits used in the conversion process. In some embodiments, higher resolution ADCs 136 may provide more precise digital representations of the analog signals. Once the analog signals are sampled, the ADC 136 may quantize each sample by assigning it a digital value that represents the closest corresponding amplitude level. This digital data is then output from the ADC 136 and sent to the DSP 138 for further processing. The DSP 138 uses this digital data to perform various tasks such as demodulation, noise reduction, and feature extraction, ultimately providing meaningful information about the target materials to the control panel.

Further, embodiments may include a digital signal processor, or DSP 138, which may be a specialized microprocessor designed specifically for the efficient execution of digital signal processing tasks. The DSP 138 may be optimized for the high-speed numerical calculations to process signals in real time. The primary functions of the DSP 138 may include filtering, transforming, and manipulating signals to extract useful information, enhance signal quality, or compress data. In some embodiments, this may be achieved through a series of mathematical operations such as Fast Fourier Transforms (FFT), convolutions, and digital filtering algorithms. The DSP 138 may be a component within the receiver unit 122 that is responsible for processing the digital signals converted from analog by the ADC 136. The DSP 138 may analyze these digital signals in real time to extract meaningful information about the target materials and provide the data useful for accurate detection and identification. For example, when the system is activated, the phased array antenna 146 transmits an RF signal that interacts with potential target materials in the environment. The responded signals are captured by the antenna elements, amplified, filtered, and then converted into digital format by the ADC 136. This digital data is then fed into the DSP 138 for further processing. The DSP 138 may perform noise reduction to eliminate unwanted signals and improve the clarity of the data, which involves applying digital filters that can remove specific frequency components identified as noise. For example, if the device is set to detect arsenic, the DSP 138 will filter out any frequencies that do not correspond to the characteristic frequencies of arsenic, thus isolating the relevant signals. The DSP 138 may perform demodulation, which involves extracting the original information-bearing signal from the modulated carrier wave. In some embodiments, the DSP 138 may utilize algorithms to demodulate the signal based on the modulation scheme used during transmission. The DSP 138 may perform feature extraction, identifying characteristics of the signal that indicate the presence of the target material, which may involve analyzing the digital signal for specific patterns or signatures that match known profiles of the material being detected. For example, the DSP might recognize the frequency pattern corresponding to arsenic and confirm its presence based on the extracted features. In some embodiments, the DSP 138 may perform real-time data analysis, continuously processing the incoming data stream to provide immediate feedback to the control panel 156. The DSP 138 may send the processed data to the control panel 156 for further analysis and decision-making. In some embodiments, the control panel 156 may use this data to determine the presence and location of target materials, trigger alerts, log detection events, or initiate further actions for the system's operational protocols.

Further, embodiments may include a processor 140, which may be responsible for executing instructions from programs and controlling the operation of other hardware components. The processor 140 may perform basic arithmetic, logic, control, and input/output (I/O) operations specified by the instructions in the programs. The processor may operate by fetching instructions from memory 142, decoding them to determine the operation, executing the operations, and then storing the results. In some embodiments, the processor 140 may coordinate the overall system operations, manage communication between subsystems, and handle complex data analysis tasks that complement the real-time signal processing performed by the DSP 138. For example, when the RF detection device 102 is powered on, the processor 140 may initiate a boot-up sequence that includes running diagnostics to check the status of all subsystems, such as the transmitter unit 106, receiver unit 122, and control panel 156. During this initialization phase, the processor 140 may provide that each component receives the correct voltage and current levels for operation. The processor 140 may also load predefined detection configurations and communicate with the transmitter unit 106 and receiver unit 122 to configure their operating parameters based on the target material. In some embodiments, the processor 140 may manage the system's operation by monitoring the status of the phased array antennas 146, controlling the phase shifters 150 in the beamforming network 148, and providing the synchronized functioning of the DSP 138. For example, when the device is set to detect a specific material like arsenic, the processor 140 may send commands to adjust the frequency, amplitude, and modulation type of the RF signal generated by the transmitter unit 106. The processor 140 may coordinate with the DSP 138 to process the received signals, applying noise reduction and feature extraction algorithms. In some embodiments, the processor 140 may handle user interface tasks, displaying system status indicators and receiving user inputs. The processor 140 may facilitate that the control panel 156 provides real-time feedback, such as green LED indicators for successful power-up and system readiness. In some embodiments, the processor 140 may manage data storage and logging, recording detection events and system performance metrics for future analysis. In some embodiments, the processor 140 may be powerful enough to handle real-time adjustments and calculations for the beamforming network 148.

Further, embodiments may include a memory 142, which may include suitable logic, circuitry, and/or interfaces that may be configured to store a machine code and/or a computer program with at least one code section executable by the processor 140. Examples of implementation of the memory 142 may include, but are not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions. In some embodiments, the memory 142 may store configuration settings, signal patterns, and detection algorithms.

Further, embodiments may include a micromotor 144, which may be a miniature electric motor typically used in applications requiring precise, small-scale mechanical movements that convert electrical energy into mechanical energy, facilitating movement or rotation in a controlled manner. In some embodiments, the micromotor 144 may be employed to enhance the operational flexibility of the phased array antenna 146 by enabling it to cover a full 360-degree field of view through mechanical rotation. Although the phased array antenna 146 itself can electronically steer its beam across a 180-degree field of view, integrating a micromotor allows the device to physically rotate the antenna array to cover the remaining 180 degrees that are not in the electronic field of view. For example, the control panel 156 may assess the current orientation and coverage of the phased array antenna 146. If the target area extends beyond the 180-degree field of view, the processor 140 may send a command to the micromotor 144 to rotate the antenna. The micromotor 144, driven by precise electrical signals, rotates the phased array to the specified angle, expanding the scan area. In some embodiments, the rotation may be controlled to maintain the accuracy and stability for effective signal transmission and reception. In some embodiments, the micromotor 144 may be precisely controlled to adjust the physical orientation of the antenna array if needed and may provide that the phased array can be mechanically positioned for optimal signal reception, complementing the electronic phase shifting.

As an example, in military applications, detection of uranium in military sites involves a full 360-degree rotation pattern, covering an entire area in a continuous sweep at a slow rotation speed of 1 RPM. This allows for complete surveillance of the area, detecting uranium even in concealed locations, with slow speed maximizing detection accuracy by allowing thorough analysis of signals from all directions. For detection of IEDs, a sector-based rotation pattern rotating in 90-degree increments to focus on specific sectors at a moderate speed of 2-3 RPM allows detailed scanning of high-risk sectors while maintaining the ability to quickly reorient to other areas, balancing detection accuracy with timely response to threats. As an example, in security applications, detection of gunpowder at border checkpoints involves a back-and-forth sweep rotation pattern covering a 180-degree field, rotating back and forth at a moderate to high speed of 3-5 RPM to concentrate on the direction where vehicles and individuals are most likely to pass through, ensuring rapid scanning of incoming traffic and maintaining a high throughput at the checkpoint. Detection of explosives in public events uses a randomized rotation pattern with randomized angles covering the entire 360-degree field at a variable speed of 1-4 RPM, where an unpredictable pattern prevents adversaries from predicting the scanning pattern, increasing the chances of detecting hidden explosives, and variable speed enhances detection by adjusting based on crowd density and movement. As another example, in medical applications, cancer detection in clinical settings uses a targeted arca scan rotation pattern, focusing on specific parts of the patient's body at a slow rotation speed of 0.5-1 RPM to provide detailed scanning of target areas, enhancing the accuracy of cancer detection, and slow speed maximizes the quality of received signals for detailed analysis. Environmental monitoring for toxic substances involves a full 360-degree continuous sweep rotation pattern covering the entire room or area at a moderate speed of 2-3 RPM to facilitate detection of toxic substances in all parts of the environment, balancing the need for thorough analysis with timely monitoring results. By integrating micromotor 144 for phased array antenna 146 rotation, the device can achieve improved or optimal coverage and detection performance tailored to specific applications. In military, security, and medical fields, precise control over the rotation pattern and speed facilitates effective scanning, enhancing the detection of target materials such as uranium, gunpowder, explosives, and cancer cells.

Further, embodiments may include a phased array antenna 146, which may be a type of antenna array that uses multiple radiating elements, each with an adjustable phase and amplitude. By electronically controlling these phases and amplitudes, the phased array antenna 146 can steer its beam directionally without moving the physical structure. This beam steering is achieved through constructive and destructive interference patterns, allowing the antenna to focus its signal in specific directions and scan across a wide area rapidly (e.g., over an field of view of 30 to 60 degrees, 60 to 90 degrees, 90 to 120 degrees, 120 to 150 degrees, or 150 to 180 degrees). The phased array antenna 146 may both transmit and receive signals to detect specific materials. In some embodiments, the phased array antenna 146 may contain a 16-element phased array to enhance its detection accuracy and efficiency through advanced beamforming techniques. For example, upon system activation, the control panel 156 configures the transmitter unit 106, which generates an RF signal tailored to the target material's properties. For example, if the device is set to detect arsenic, the transmitter unit generates a signal at a frequency such as 108 Hz, derived from the atomic structure of arsenic. This signal is distributed to each of the 16 antenna elements in the phased array. The beamforming network 148, which includes phase shifters 150, adjusts the phase and amplitude of the signal at each element. By controlling these parameters, the beamforming network 148 may provide that the signals from all elements combine constructively in a specific direction, forming a focused beam. This electronic steering allows the system to scan the environment without physically moving the antenna. As the transmitted RF signal propagates through the environment, it interacts with potential target materials. The responded signals are then captured by the phased array antenna 146 elements. Each element receives the incoming signal, which may arrive at different phases due to the varying distances from the target. The phase shifters 150 in the beamforming network 148 may adjust the phases of these received signals so that they combine constructively from the direction of interest, enhancing the signal strength and clarity, making it easier to detect the presence of the target material. The combined and adjusted signals are then sent to the receiver unit 122, and these signals may undergo amplification to boost their strength and filtering to remove noise. The analog signals are then converted into digital form by ADCs 136. The DSP 138 may process these digital signals, performing tasks such as demodulation, noise reduction, and feature extraction. The processed data is sent to the control panel 156 for detailed analysis, where advanced algorithms compare the data against known profiles of target materials to make detection decisions.

Further, embodiments may include a beamforming network 148, which may be used to control the direction and shape of the transmitted or received signal beams. The beamforming network 148 may manipulate the phase and amplitude of the signal at each antenna element to constructively or destructively interfere with the waves, thereby steering the beam in a desired direction without physically moving the antenna. This electronic steering may be achieved through precise phase shifts and amplitude adjustments, allowing the antenna to focus its energy in specific directions, enhancing signal strength and reception from those areas. For example, when the system is activated, the transmitter unit 106 configures the RF signal parameters, such as frequency, amplitude, and modulation type, based on the material to be detected. This signal is then sent to the beamforming network 148, which includes phase shifters 150 and amplitude control circuits. For example, if the device needs to detect arsenic, the transmitter unit 106 may generate a signal at 108 Hz, derived from the sum of protons and atomic mass. The frequency is provided as an example; the exact frequency may be determined through experimentation. This signal is then distributed to each of the 16 antennas in the array. The beamforming network 148 adjusts the phase and amplitude of the signal for each antenna element such that when these signals combine in space, they create a focused beam directed toward the target arca.

Upon transmission, the phased array antenna 146 emits the RF signal, which interacts with the environment and any target materials. The responded signals are captured by the same antenna elements. The beamforming network 148 then processes these received signals, adjusting their phase and amplitude to focus on signals from the desired direction. Once the signals are focused and combined by the beamforming network 148, they are sent to the receiver unit 122 for further processing. Initial amplification and filtering may be performed to boost the signal strength and remove noise. The analog signals are then converted into digital form by Analog-to-Digital Converters or ADC 136. These digitized signals are processed by the Digital Signal Processor or DSP 138, which demodulates the signals, reduces noise, and extracts features indicative of the presence of target materials. For example, the DSP 138 might filter out non-relevant frequencies and enhance the signal components that match the expected response from arsenic. The processed data is then transmitted to the control panel 156 for final analysis. In some embodiments, the control panel 156 may utilize advanced algorithms to compare the received data against known profiles of target materials, making decisions about the presence and location of hazardous substances. By dynamically adjusting the signal paths, the beamforming network 148 allows the RF detection device 102 to maintain high sensitivity and accuracy, even in complex environments with multiple potential sources of interference.

A use case that leverages beamforming to localize a detected signal in a high interference environment involves military base surveillance for explosive detection. A military base in a hostile region faces constant threats from concealed explosives. The base is surrounded by buildings, vehicles, and equipment, creating a complex, interference-rich environment. Detecting and localizing hidden explosives like IEDs is important for security. An RF detection device with beamforming capabilities is deployed at a strategic location within the base. Upon activation, the control panel initializes the system, powering up the transmitter unit, receiver unit, phased array antenna 146, and micromotor 144. The transmitter unit sets the RF signal parameters to match the resonance frequency of common explosives. The signal is sent to the beamforming network, where phase shifters and amplitude control circuits adjust it for each of the 16 antennas in the phased array antenna 146. The beamforming network provides the combined signal forms a focused beam directed toward areas of interest, such as the base perimeter or potential hiding spots. The phased array antenna 146 emits the focused RF signal, scanning the environment for responded signals from explosive materials. Responded signals are captured by the phased array antenna 146 elements. The beamforming network 148 processes these signals, adjusting their phase and amplitude to focus on signals from specific directions, filtering out interference from other sources. This helps localize the source of the responded signal corresponding to the target explosive. The received signals undergo amplification and filtering to boost strength and reduce noise. Analog signals are converted to digital by the ADC 136, and the DSP 138 processes the digitized signals, applying noise reduction and feature extraction algorithms to identify explosive materials. The control panel 156 receives the processed data and uses algorithms to compare signal profiles against known explosive signatures. The system can dynamically adjust the beam direction to pinpoint the explosive's exact location, even amid high interference. The control panel 156 may provide real-time alerts and visual localization on a base map, highlighting the exact coordinates of the threat. By leveraging beamforming, the RF detection device 102 isolates and localizes signals from explosives in a high interference environment, enhancing security by enabling precise detection and rapid response, improving the safety of personnel and infrastructure. The beamforming network's 148 beam steering and interference filtering allow accurate identification of hidden explosives, improving military surveillance and security operations.

Further, embodiments may include a plurality of phase shifters 150, which may be electronic components used to change the phase angle of an RF signal. Phase shifters 150 may adjust the relative phase of the signals fed to or received from different antenna elements, allowing the constructive and destructive interference patterns to steer the beam electronically. These adjustments enable the precise control of the direction and focus of the RF beam without moving the physical antenna structure, enhancing the performance and flexibility of the system. In some embodiments, the phase shifter 150 may adjust the phase of the RF signals at each antenna element, enabling precise control over the beam direction and improving the signal-to-noise ratio. For example, when the system is activated, and the transmitter unit 106 configures the RF signal, phase shifters 150 may be employed to adjust the phase of the signals fed to each of the 16 antenna elements in the array. For example, when detecting arsenic, the transmitter unit might generate a signal at a specific frequency derived from the atomic properties of arsenic. This signal is distributed to each antenna element, and the phase shifters 150 modify the phase angle of the signal at each element. By precisely controlling these phase shifts, the beamforming network 148 may direct the combined signal beam toward the target arca. For example, if the target material is located at a specific angle relative to the array, the phase shifters 150 will adjust the phases such that the signals from all elements add up constructively in that direction, creating a focused beam. On the reception side, the responded signals from the target material may be captured by the antenna elements. The received signals may arrive at each element with different phase angles due to the varying path lengths. The phase shifters 150 may adjust these incoming signals' phases so that when they are combined, they reinforce each other from the desired direction. In some embodiments, the phase adjustment enhances the signal strength and clarity, making it easier to detect the presence of the target material. In some embodiments, the adjusted signals are then passed to the receiver unit 122, where they undergo further processing. Initially, the signals are amplified and filtered to remove noise. In some embodiments, when detecting a hazardous material, the control panel 156 may determine the phase adjustments and send commands to the phase shifters 150 to implement these changes.

Further, embodiments may include a directional shield 152, which may be a physical barrier or enclosure designed to direct or block electromagnetic radiation in a specific direction. The directional shield 152 may be constructed from conductive materials such as metal to attenuate or respond RF signals, thereby controlling the propagation of electromagnetic waves. The directional shield 152 may be positioned around the RF oscillator and phased array antenna 146 components and may act as a physical barrier that prevents RF signals from propagating in undesired directions, thereby enhancing the precision and accuracy of signal transmission and reception. During operation, when the transmitter unit 106 generates an RF signal, the directional shield 152 helps to focus and channel this signal toward the intended detection area. By reducing signal dispersion and reflection, the directional shield 152 improves the efficiency of signal transmission and enhances the system's overall sensitivity to detecting RF reflections from underground objects or materials.

Further, embodiments may include a power supply 154, such as batteries serving as the power source for specific components within the RF detection device 102, including the control panel 156. These batteries are designed to store electrical energy and supply it to the respective components. The batteries in the control panel 156 may be rechargeable or replaceable cells capable of providing DC voltage. They are selected based on factors such as voltage output and capacity, which may be measured in ampere-hours, Ah, and size to meet the power requirements of each component effectively. In some embodiments, the control panel 156 relies on batteries to maintain functionality for user interface operations, data processing, and communication with other parts of the RF detection device 102. The batteries in the control panel 156 provide that they remain operational during field use, supporting tasks such as signal monitoring, parameter adjustment, and data transmission. In some embodiments, the batteries used in these components may include lithium-ion, nickel-metal hydride, or other types suitable for portable electronic devices. They are integrated into the design to provide sufficient power capacity and longevity, allowing the RF detection device 102 to operate autonomously for extended periods between recharges or battery replacements.

Further, embodiments may include a control panel 156, which may be a centralized interface comprising electronic controls and displays. The control panel 156 may serve as the user-accessible interface for configuring, monitoring, and managing the RF detection device's 102 operational parameters and data output. In some embodiments, the control panel 156 may be designed to provide operators with intuitive access to control and monitor various aspects of the RF detection device 102. The control panel 156 may allow for the configuration of settings such as signal frequency, transmission power, receiver sensitivity, and signal processing algorithms. In some embodiments, operators may use the control panel 156 to initiate and terminate detection operations, adjust calibration settings, and troubleshoot operational issues. In some embodiments, the control panel 156 may include a graphical display screen or LED indicators to present real-time status information and measurement results. In some embodiments, input controls such as buttons, knobs, or touch-sensitive panels may enable operators to interact with the device, input commands, and navigate through menu options. The control panel 156 may interface directly with the internal electronics of the RF detection device 102, including the transmitter unit 106, the receiver unit 122, the phased array antenna 146, and signal processing circuitry. Through electronic connections and communication protocols, the control panel 156 may send commands to adjust operational parameters and receive feedback and status updates from the device. In some embodiments, the control panel 156 may be mounted on the support frame 104 and may provide an operator with control of the RF detection device 102, including adjusting various settings and signaling the operator of a detected material. In some embodiments, a rechargeable battery may power the RF detection device 102, including the transmitter unit 106, the receiver unit 122, and the control panel 156. In some embodiments, multiple batteries may be used. In some embodiments, a tone generator, such as a speaker, may be mounted to the support frame 104 to provide audible signals to the operator for detecting target materials.

Further, embodiments may include a communication interface 158, which may be a hardware and software solution that enables data exchange between different systems or components within a network. The communication interface 158 may act as a bridge, facilitating the transfer of information by converting data into a format that can be transmitted and received by different devices. In some embodiments, the communication interface 158 may support various protocols and standards, such as Ethernet, Wi-Fi, Bluetooth, USB, and others, depending on the application requirements. For example, an Ethernet interface may be used for wired network connections, providing reliable and high-speed data transfer. In some embodiments, a Wi-Fi interface may enable wireless connectivity, allowing the device to communicate with remote servers, mobile devices, or cloud-based applications without physical cables. In some embodiments, Bluetooth and USB interfaces may also be included for short-range wireless communication and direct data transfer, respectively. The communication interface 158 may transmit the processed data from the DSP 138 to external systems for further analysis, reporting, or storage.

After the DSP 138 processes the signals received from the ADC 136 and extracts meaningful information about the target materials, the control panel 159 may package this data into suitable formats, such as JSON or XML. The communication interface 158 may then send this data over the network to a remote server or database, where it can be accessed by operators, analysts, or automated systems for further decision-making. In some embodiments, the communication interface 158 may provide remote monitoring and control of the RF detection device 102. Operators may use a web-based interface or a mobile application to access real-time status updates, view detection logs, and adjust configuration settings. For example, if the RF detection device 102 needs to be calibrated for a new target material, the configuration updates can be sent remotely through the communication interface, minimizing the need for on-site adjustments.

In some embodiments, the communication interface 158 may support alerting and notification functionalities. When the control panel 156 detects the presence of hazardous materials, it can use the communication interface 158 to send immediate alerts to designated personnel via email, SMS, or push notifications. Further, embodiments may include a detection module 160, which may be responsible for configuring and generating the RF signal through the transmitter unit 106. It interacts with the control panel 156 to set parameters such as frequency and amplitude for detecting specific target materials. Once the RF signal is configured and sent to the phase shifters 150, the RF signal is transmitted via the phased array antenna 146, and the detection module 160 monitors the receiver unit 122 for RF signal reception. Upon receiving the RF signal via the phased array antenna 146, the detection module 160 processes the signal to extract relevant data about the presence of target materials. This processed data is then sent to the control panel 156 for further analysis and decision-making. The detection module 160 operates iteratively as long as the system remains activated, continuously polling and analyzing data to detect and identify target materials based on the received RF signals.

Further, embodiments may include a cloud 162 or communication network, which may be a wired and/or wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), radio waves, and other suitable communication techniques. The communication network may allow ubiquitous access to shared pools of configurable system resources and higher-level services that can be rapidly provisioned with minimal management effort, often over the Internet, and relies on the sharing of resources to achieve coherence and economics of scale, like a public utility, while third-party clouds 162 enable organizations to focus on their core businesses instead of expending resources on computer infrastructure and maintenance. Further, embodiments may include a network 164, which may be a collection of interconnected devices that communicate with each other to share resources, data, and applications. In some embodiments, the network 164 may utilize various protocols, such as TCP/IP, to provide that data is transmitted accurately and efficiently. In some embodiments, the network 164 may transmit the processed data from the DSP 138 to user devices 166, allowing operators to view and analyze the data collected. The network 164 may be designed to support real-time data transmission, remote monitoring, and analysis functionalities such that the system operates efficiently and effectively.

Upon receiving the processed signals from the DSP 138, the control panel 156 may package the data into standardized formats such as JSON or XML, making it suitable for transmission over the network 164. In some embodiments, the network 164 setup may involve an Ethernet or Wi-Fi interface integrated into the control panel 156, which establishes a connection to the local network or the internet. For example, when the control panel 156 detects the presence of target materials, it sends the relevant data to the server or cloud platform via the network 164. The data is then processed and stored, allowing operators to access it through their user devices. For example, if the RF detection device 102 identifies a hazardous material, the data may be immediately transmitted to the cloud platform, where it triggers alerts and notifications to the operators' devices. Operators can then log into the platform, view detailed reports, and analyze the data to make informed decisions.

Further, embodiments may include a user device 166, which may be an electronic device that provides an interface for users to interact with applications, data, and other digital services. In some embodiments, user devices 166 may include desktop computers, laptops, tablets, and smartphones to specialized equipment like industrial handhelds or medical diagnostic tools. In some embodiments, the user device 166 may include input mechanisms, such as keyboards, touchscreens, etc., and output displays, such as screens, processing capabilities, storage, and connectivity options. The user device 166 may enable operators to view and analyze the data collected by the RF detection device 102. In some embodiments, the user device 166 may act as an interface through which operators receive real-time updates, visualize data, and make informed decisions based on the detected signals. In some embodiments, the user device 166 may connect to the network 164, where the RF detection data is stored and processed. For example, the RF detection device 102 may identify the presence of hazardous materials, and the processed data from the DSP 138 may be transmitted over the network 164 to the user device 166, which may be equipped with specialized application software or a web-based interface designed to display the data in a user-friendly and comprehensible format. In some embodiments, the user device 166 may include a high-resolution display screen that presents data visualizations, such as graphs, charts, and maps, allowing operators to quickly interpret the detection results. In some embodiments, the user device 166 may include various connectivity options, such as Wi-Fi, Ethernet, Bluetooth, and cellular networks, to facilitate reliable communication with the RF detection device 102 and remote servers. In some embodiments, the user device 166 may include interactive dashboards, customizable alerts, and detailed logs of detection events. For example, an operator may use the interface to set thresholds for alerts, view historical data trends, and configure the detection parameters remotely.

To enhance the phased array antenna system, we can use a first optimized phase array element, such as we can optimize the beamforming network 148 for specific target frequencies by precisely controlling the phase and amplitude of signals at each antenna element 146. This provides that transmitted and received signals are accurately focused, enhancing the detection of materials that resonate at specific frequencies, such as 108 Hz for arsenic or 1160 Hz for nitroglycerin. By integrating a dynamic phase adjustment algorithm in the beamforming network 148, the phase shifters 150 can automatically fine-tune based on real-time signal feedback to maintain optimal focus on specific frequencies.

In another embodiment, an optimized or tuned phase array element for a single frequency may include implementing adaptive algorithms within the beamforming network 148, allowing dynamic adjustment of the beam direction based on real-time feedback. This helps mitigate interference by steering the beam toward the strongest signal source, facilitating that specific target frequencies are clearly detected and isolated, including a machine learning-based adaptive beamforming system that continuously learns and adjusts beam directions to increase or maximize signal strength at the target frequency.

In another embodiment, an optimized phase array element for a single frequency may include a control panel 156 that can be enhanced with automated calibration routines to adjust the beamforming network 148 and phased array antenna 146 for optimal performance at different frequencies. Automatically tuning the system may result in the transmission and reception are at or near peak efficiency for the target frequencies, such as 108 Hz for arsenic or 1160 Hz for nitroglycerin. Developing an automated calibration software integrated into the control panel 156 that periodically runs diagnostics and adjusts the system settings for optimal performance may further improve accuracy.

In another embodiment, an optimized phase array element for a single frequency may include integrating real-time signal strength and quality visualizations on the control panel 156 to help operators monitor and adjust settings promptly. This provides the system remains tuned to the correct frequencies, improving the detection of specific materials. Adding a high-resolution display to the control panel that shows the exact frequency being detected, along with real-time signal strength and quality indicators, would greatly aid in this process.

In another embodiment, an optimized phase array element for a single frequency may include an upgraded the DSP 138 to handle advanced filtering, demodulation, and noise reduction such that signals at specific frequencies are processed with high accuracy, improving the detection of materials that resonate at those frequencies. Using a multi-core DSP with dedicated processing units for filtering, demodulation, and noise reduction to handle complex signal processing tasks more efficiently would enhance system performance. Incorporating machine learning algorithms within the DSP 138 for pattern and anomaly detection can identify subtle differences in signal patterns, enhancing the ability to detect and classify materials at specific frequencies. Implementing a machine learning module within the DSP that continuously trains on received data to improve detection algorithms over time would reduce false positives and improve overall detection accuracy.

In another embodiment, an optimized phase array element for a single frequency may include using low-noise amplifiers within the receiver unit 122 to improve the signal-to-noise ratio, making it easier to detect weak signals at specific frequencies, such as those corresponding to hazardous materials. Integrating ultra-low-noise amplifiers with high gain and stability into the receiver circuit enhances sensitivity and reduces signal loss. Employing high-resolution Analog-to-Digital Converters (ADC 136) captures more detailed signal information, which is useful for accurately identifying materials resonating at specific frequencies. Upgrading to 24-bit ADCs with high sampling rates improves the accuracy and resolution of the digitized signals.

In another embodiment, an optimized phase array element for a single frequency may include designing a directional shield 152 that adjusts its opening dynamically to match the beam direction, reduces or minimizes external noise, and provides that the phased array antenna 146 focuses on the target frequencies, improving detection precision and reducing interference. Implementing motorized adjustable shielding that can automatically align with the beam direction, controlled by the control panel 156, may enhance this capability. Utilizing advanced materials for the directional shield 152 better blocks unwanted signals, allowing the phased array antenna to receive signals at specific frequencies with higher clarity, enhancing overall system performance. Using high-performance composite materials with superior RF attenuation properties for directional shield construction would be beneficial.

In another embodiment, an optimized phase array element for a single frequency may include implementing efficient power management systems, providing consistent power delivery, and maintaining the integrity of transmitted and received signals, especially for those handling specific frequency signals. Integrating a smart power management system that dynamically allocates power based on real-time demand and component requirements may improve or optimize performance. Using high-capacity, long-life rechargeable batteries supports extended operation such that the system can continuously transmit and receive at specific frequencies without interruption. Using lithium-polymer batteries with high energy density and smart charging circuits increases or maximizes battery life and performance.

In another embodiment, an optimized phase array element for a single frequency may include improving the communication interface 158 to enable seamless data transfer to cloud systems, allowing for centralized data analysis and storage. This provides operators with real-time access to detection results and enables remote calibration and adjustment for specific frequencies. Developing a secure cloud API for data transfer and remote access provides real-time updates and control. Enabling remote control capabilities and firmware updates facilitates easy maintenance and provides the system remains capable of detecting new target frequencies as they are identified. Implementing an over-the-air (OTA) update system for firmware allows for remote diagnostics and software improvements.

In another embodiment, an optimized phase array element for a single frequency may include a high-interference environment, such as an industrial area. These enhancements would be particularly beneficial. Upon activation, the control panel 156 may initiate automated calibration routines, adjusting the beamforming network 148 and phased array antenna 146 to improve or optimize performance at specific frequencies despite interference. The control panel displays the frequency being calibrated. The adaptive algorithms in the beamforming network dynamically adjust the beam direction to focus on the target frequency, such as 108 Hz for arsenic, continuously adapting to minimize the impact of interference. The receiver unit 122, equipped with low-noise amplifiers and high-resolution ADCs, captures weak signals at the target frequency, facilitating clear detection. The DSP 138 employs advanced filtering and machine learning algorithms to isolate and identify signals at the specific target frequency, improving detection accuracy. Processed data is transmitted via the enhanced phase array antenna 146. In some embodiments, elements of the phased array antenna 146 may be optimized for a specific frequency in high-interference environments. Implementing an optimized phased array antenna 146 for a specific frequency in high-interference environments involves sophisticated user feedback to enhance usability, accuracy, and reliability. The control panel 156 may display the name of the frequency or a code for the target rather than the actual frequency. A real-time directional display, represented on a compass-like interface or radar screen, may show the precise direction of the detected signal, along with a graphical representation of the phased array beam steering to indicate how the beam is adjusted to focus on the target signal. Instantaneous feedback on signal detection, with rapid updates as the beamforming network 148 adjusts, helps users quickly ascertain the presence and location of the target material. A dynamic scanning display shows the scanning process, including beam movements and signal acquisition in different directions, while adaptive calibration status provides real-time updates on the calibration process. Signal quality indicators replace detailed signal readings, showing users the quality of the received signal for the specific target. An interference level indicator shows the level of environmental interference. Detailed feedback on the status of automated calibration routines and real-time system health monitoring alerts users to any anomalies or issues with components such as the phased array antenna 146, beamforming network 148, and micromotor 144. Feedback on environmental conditions like temperature, humidity, and electromagnetic interference levels is also useful. A customizable display may allow users to prioritize specific parameters based on their preferences, with access to historical data and logs for tracking performance over time. Interactive tutorials and may help guides provide step-by-step instructions for optimizing the system for specific targets. Advanced analytics from machine learning algorithms may offer insights and recommendations for improving detection accuracy, and predictive maintenance alerts notify users of potential maintenance needs based on usage patterns and system diagnostics.

In another embodiment, a material detection system uses a hybrid antenna that can operate both in RF-based and magnetic-based detection modes. This system is capable of switching between detecting materials based on their interaction with the RF field or the magnetic field, depending on the material being analyzed. In RF mode, the antenna transmits RF waves, and the system analyzes how the material reflects or absorbs these waves, providing information based on the dielectric constant or conductive properties of the material. In magnetic mode, the antenna focuses on the interaction between the material and the magnetic field component of the electromagnetic wave, allowing detection of materials with high magnetic permeability or strong magnetic responses. For example, the system could be used to detect metallic substances or magnetic compounds, such as those found in explosive materials, by optimizing the detection process based on which field interaction yields the clearest signature.

In yet another embodiment, a near-field material detection system uses a magnetic-based loop antenna that focuses on magnetic field interaction within close proximity to the target material. This system uses magnetic resonance principles, detecting changes in the magnetic field due to interactions with materials possessing magnetic susceptibility, such as ferromagnetic metals. The loop antenna generates a localized oscillating magnetic field, and when materials are introduced into the detection zone, they alter the field by inducing eddy currents or magnetic resonance effects. These changes are then measured to determine the material's properties. This method is particularly useful in applications such as industrial quality control or close-range security screening, where detecting the magnetic characteristics of a material offers clear advantages.

In still another embodiment, far-field magnetic resonance techniques are employed for material detection at greater distances. This system operates by transmitting an electromagnetic wave where the magnetic field component is emphasized, focusing on its interaction with materials that have resonant magnetic properties. By tuning the system to specific resonant frequencies, materials that exhibit strong magnetic responses, such as certain alloys or ferromagnetic materials, can be detected over a larger range. The detection system then analyzes the phase or amplitude of the reflected wave to infer material characteristics. This embodiment is particularly suitable for remote sensing applications, such as geological surveys, where materials can be identified based on their magnetic resonance even when located at a distance from the detection apparatus.

In other embodiments, an array of antennas is used to simultaneously detect materials based on both RF and magnetic field interactions. The antenna array includes dipole antennas optimized for detecting the electric component of the RF wave and loop antennas that focus on the magnetic field interaction. These two types of signals are combined to create a composite material signature, allowing for detailed analysis of both the dielectric and magnetic properties of the material. By processing both electric and magnetic field data, the system can more accurately identify materials that exhibit a combination of electrical conductivity and magnetic permeability, such as advanced composites or stealth materials. This dual-mode system can be particularly useful in defense or aerospace applications.

In still other embodiments, a magnetic-based antenna system is designed for material detection in environments where RF signals would typically be degraded, such as underground or underwater. This system uses a loop antenna to generate a magnetic field that interacts with materials possessing strong magnetic properties, even in situations where RF signals are heavily attenuated. The antenna detects variations in the magnetic field caused by materials with high permeability, such as iron or nickel-based substances. This method allows for the detection of magnetic materials in conditions where RF detection would be unreliable, such as in deep-sea exploration or subterranean mining operations, where conventional RF signals would fail to penetrate effectively.

In further embodiments, a phased array system is designed specifically to manipulate the magnetic component of the electromagnetic wave for high-resolution material detection. A phased array of loop antennas is used to steer and focus the magnetic field, creating a directed magnetic beam that can scan across a target area. The system detects materials based on how they alter the magnetic field, allowing for precise location and identification of magnetic objects. By adjusting the phase and amplitude of each antenna element, the system provides a fine degree of control, enabling highly localized material detection. This approach is useful in situations requiring detailed spatial resolution, such as identifying hidden metallic objects in security screening or detailed inspections in industrial settings.

In additional embodiments, a portable or wearable material detection system is implemented using a small, magnetic-based loop antenna for detecting magnetic materials in close proximity. This compact system allows security personnel or industrial workers to move through different environments while continuously monitoring for materials that exhibit magnetic properties. The loop antenna generates a localized magnetic field and detects perturbations caused by nearby magnetic materials, such as concealed weapons or magnetic tags. The system then alerts the user when such materials are detected, making it ideal for field operations where mobility and case of use are critical.

In yet another embodiment, the material detection system is entirely RF-based, using a highly optimized RF antenna to detect materials based solely on their interaction with the RF field. The RF antenna transmits electromagnetic waves at specific frequencies, and the system analyzes how these waves are reflected, absorbed, or scattered by the material. By focusing on the dielectric constant or conductive properties of the target material, the system can accurately identify substances such as explosives, chemicals, or other dielectric materials. This approach is particularly effective in environments where magnetic field-based detection is unnecessary or less effective. The RF-based system can be adapted for wide-ranging applications, from industrial material testing to security scanning, where detecting the electrical characteristics of the material is sufficient for identification.

Figure 2:
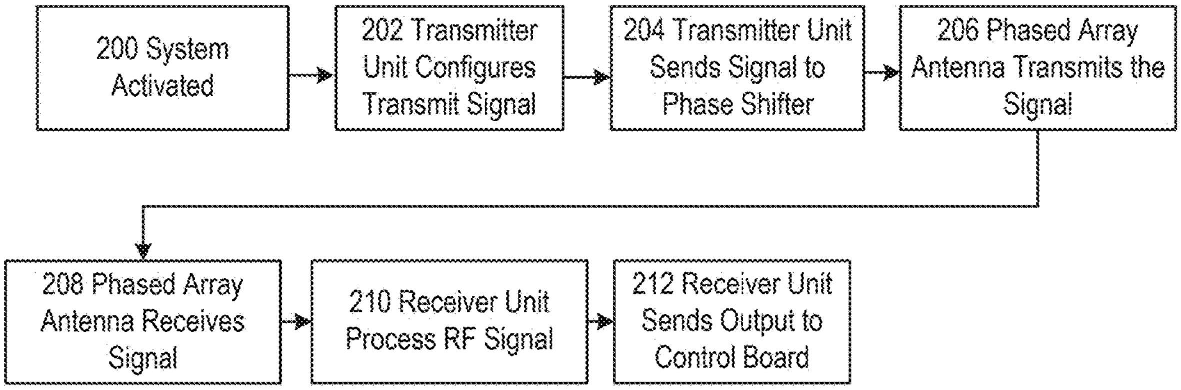
FIG. 2 illustrates a detection module according to an embodiment.

FIG. 2 illustrates the detection module 160. The RF detection device 102 is activated at step 200. The process begins with the activation of the power supply 154. In some embodiments, batteries in the transmitter unit 106, receiver unit 122, and control panel 156 may provide the electrical energy. When the power switch is turned on, the power supply 154 distributes power to all subsystems, providing that each component receives the correct voltage and current levels for operation. In some embodiments, the control panel 156 may begin a boot-up sequence, running diagnostics to check the status of each subsystem, and may communicate with the transmitter unit 106 and receiver unit 122, sending initialization commands to configure their operating parameters. In some embodiments, status indicators on the control panel 156 may display the progress of the initialization process, showing a green LED to indicate successful power-up and system readiness. The control panel 156 may load the predefined detection configurations, providing the system is set to detect specific hazardous materials accurately.

In some embodiments, a frequency for transmission is selected for a particular element based on the number of protons, number of neutrons, and/or atomic mass, such as the sum of protons and neutrons, for the element. For example, the selected frequencies for Arsenic (As) may be 33 Hz, based on the number of protons, 42 Hz, based on the number of neutrons, and 75 Hz, based on atomic mass. The values for the frequencies are provided as examples; the exact values may be determined through experimentation. These frequencies can also be increased by one or more orders of magnitude, such as 10×, 100×, etc. Similarly, the frequencies for a compound can be selected based on the sum total of the constituent parts. For example, a Formaldehyde molecule has a combined total of 16 protons, corresponding to a frequency of 16 Hz, 14 neutrons, corresponding to a frequency of 14 Hz, and a mass of 30, corresponding to a frequency of 30 Hz. Individual scans using two or more of these frequencies can be used to uniquely identify the element or compound. In some embodiments, a frequency is selected for a particular element based on the sum of the number of protons and atomic mass, such as the sum of protons and neutrons, for the element. For example, the selected frequency for Arsenic (As) would be 108 Hz based on the addition of 33 protons with 75 atomic mass. This frequency can also be increased by one or more orders of magnitude, such as 10×, 100×, etc. Similarly, the frequency for a compound can be selected based on the sum total of the constituent parts. For example, a Formaldehyde molecule has a combined total of 16 protons and a mass of 30. The corresponding frequency would be 46 Hz, addition of 16 protons with 30 mass. As another example, smokeless gunpowder would yield a base transmit frequency of 1160. The tuning frequency of 1160 Hz is derived from the chemical composition, discrete atomic structure, $CH_2NO_3CHNO_3CH_2NO_3$ for nitroglycerin. By using the atomic number, or the number of protons for each element, the frequency may be calculated as $6+(1\times2)+7+(8\times3)+6+1+7+(8\times3)+6+(1\times2)+7+(8\times3)$, which yields a sum of 116 protons in the compound. This may then be increased by an order of magnitude, such as 10×, yielding 1160 Hz as the frequency to search for nitroglycerin. In some embodiments, some elements and compounds may have overlapping frequencies using only one of the methods described above, and it may be beneficial to use multiple of the above-described methods when searching for or identifying a target material.

The detection module 160 commands the transmitter unit 106 to configure, at step 202, the transmit signal. The transmitter unit 106 prepares the signal that will be transmitted to detect a target material. In some embodiments, the parameters and components may be set up with the desired characteristics to generate the RF signal. The control panel 156 determines the specific parameters of the RF signal that need to be generated. The parameters may include the frequency, amplitude, and modulation type to effectively detect the target materials. Once the parameters are set, the control panel 156 sends a command to activate the oscillator circuit within the transmitter unit 106. The oscillator circuit may be responsible for generating a stable RF signal at the desired frequency and may consist of components like capacitors, inductors, and amplifiers that work together to create the oscillating signal. The power delivery to the oscillator circuit may be managed by the SCR 114. When the control panel 156 sends a gate signal to the SCR 114, SCR 114 switches from a non-conductive to a conductive state, allowing current from the power source, such as batteries, to flow to the oscillator circuit. After the oscillator circuit generates the RF signal, the transformer 116 adjusts the voltage level of the signal to match the requirements of the phased array antenna 146. The transformer 116 may also provide impedance matching to facilitate efficient signal transmission. The transformer 116 may provide that the RF signal is at the appropriate voltage and current levels for optimal transmission. For example, the control panel 156 may determine that an RF signal with a frequency of 50 Hz may be used to detect a specific material. It sends a command to the transmitter unit 106 to configure this signal. The oscillator circuit is activated, generating an RF signal at 50 Hz. The SCR 114 is triggered, allowing power from the batteries to flow to the oscillator circuit. The generated signal is then conditioned by the transformer 116, providing it is at the correct voltage level for transmission.

The detection module 160 commands the transmitter unit 106 to send, at step 204, the signal to the phase shifters 150. After the control panel 156 has configured the transmit signal with the desired parameters, the next step involves sending this prepared signal from the transmitter unit 106 to the phase shifters 150. This step facilitates the phased array antenna effectively steering the beam in the desired direction for detection of target materials. Once the oscillator circuit in the transmitter unit 106 has generated a stable RF signal at the designated frequency, components such as capacitors, inductors, and amplifiers work together to create this oscillating signal. The SCR 114 is triggered by a gate signal from the control panel 156, allowing current from the power supply 154 to flow to the oscillator circuit. Following this, the transformer 116 adjusts the voltage level of the signal to match the requirements of the phased array antenna 146, providing the signal is at the correct voltage and current levels for transmission. The conditioned RF signal is sent to the phase shifters 150. The phase shifters 150 may adjust the phase of the RF signal at each antenna element to steer the beam electronically without the physical movement of the antenna array, which allows the system to focus the transmitted energy in specific directions, enhancing the detection capability. For example, if the device is set to detect arsenic, and the selected transmission frequency is 108 Hz, based on the sum of protons and atomic mass of arsenic, the control panel 156 provides that this frequency is accurately maintained as it is sent to the phase shifters 150. The phase shifters 150 then adjust the phase of this signal across the various elements of the phased array antenna 146. By controlling the phase shifts, the system can direct the beam toward the area where the target material is expected to be found. As the signal reaches the phase shifters 150, these devices manipulate the phase of the signal for each antenna element based on the commands from the control panel 156. The phase adjustment provides that the transmitted signals from all antenna elements combine constructively in the desired direction, thereby focusing the beam precisely where needed. For example, if the system needs to scan a specific sector, the phase shifters 150 will adjust the phases accordingly to steer the beam across that sector, enhancing the probability of detecting the target material. The phased array antenna 146, equipped with phase-shifted signals, then transmits the RF energy into the environment. The responded signals from potential target materials are captured by the same antenna elements, where the phase shifters 150 focus the received signals for optimal detection and analysis by the receiver unit 122.

The detection module 160 commands the phased array antenna 146 to transmit, at step 206, the signal. The phased array antenna 146 radiates the RF signal into the environment. The radio waves propagate through the medium, such as air or ground, and interact with the target materials. The interaction between the RF signal and the target materials will produce detectable changes in the signal, which can be received and analyzed by the receiver unit 122. For example, the transmitter unit 106 generates a wave pulse at a specified frequency that is transmitted directionally into the ground. The generated frequency is closely approximate or exact to that of the target material, and that relationship creates a responsive RF wave and/or a magnetic line between the phased array antenna 146 and the target. When the RF detection device 102 is aligned with a target material (for example, when the opening of the directional shield 152 is pointing toward the target material), the voltage produced by the phased array antenna 146 changes and thereby produces a detection output signal, such as an audio signal having a tone different than that of the baseline. A response wave is produced by the target material that modifies the magnetic field passing through the phased array antenna 146 to alter the voltage produced, thereby generating the output signal.

It should be noted that the opening of the directional shield 152 may be designed to work in concert with the phased array antenna 146 in that the phased array antenna 146 can sweep an area that is not shielded, so the directional shield's 152 opening may allow the phased array antenna 146 to sweep, for example, an opening that allows 60 degrees. Then, the directional shield is moved another 60 degrees, allowing the phased array antenna 146 to sweep transmission receiving in the next opening. In this way, a 360-degree angle can be analyzed. This application may be for minimizing external noise in the environment to allow the phased array antenna 146 to focus on 60-degree increments. In other cases, a directional shield 152 may be optional.

The phased array antenna 146 is responding to a voltage increase from the phased array antenna 146 swinging over the magnetic line to the material. The detection module 160 commands the receiver unit 122 to receive, at step 208, the RF signal via phase array antenna 146. The receiver unit 122 captures the RF signal that has interacted with the environment and potential target materials using the phase array antenna 146. The phased array antenna 146 captures the incoming RF signal, which has been transmitted by the transmitter unit 106 and has interacted with the environment and any target materials present. The phased array antenna 146 may be designed to effectively capture these radio waves and convert them back into electrical signals. Once the RF signal is received by the antenna, it may be fed into an RF amplifier, which boosts the signal strength without significantly altering its characteristics. In some embodiments, the use of the standard atomic structure of a material may be used to calculate the resonant frequency to which a particular substance would generate or respond. Each element and compound include a definable atomic structure composed of the total number of protons and neutrons of that target material. This unique nuclear composition of every substance makes it uniquely identifiable and detectable. The manner in which this information is applied thus enables the detection of any target substance. A target material can be detected and located based on a resonant, responsive RF wave and/or magnetic relationship between the target and a phased array antenna 146 transmitting at a frequency specific and unique to the target material. The transmitter unit 106, through the phase array antenna 146, induces a resonance due to responsive RF waves and/or magnetic and/or otherwise in a targeted material to resonate at a specific computed frequency. The phased array antenna 146 and receiver circuit 124 detect the resonance induced in the material and, in so doing, indicate the approximate line of bearing to the material. The primary method used by this detection system to detect specific materials is based on tuning the circuit 108 of the transmitter unit 106 to a specific value that is computed for the material of interest. The frequency can be based on any of the three defining characteristics of the substance, the number of protons, the number of neutrons, or the atomic mass, such as the sum of protons and neutrons and combinations thereof. The frequency can be transmitted at varying voltages to compensate for other external effects or interference. In some embodiments, a table or database of characteristics of common materials may be used to calculate the resonant frequencies. To accomplish this tuning, the frequency of the signal from the phase array antenna 146 is set to some harmonic of the elements of the material.

The detection module 160 commands the receiver unit 122 to process, at step 210, the received RF signal. The receiver unit 122 processes the received RF signal to extract meaningful data that can be analyzed for the presence of specific materials, which may involve further amplification, filtering, digitization, and initial data processing before the signal is sent to the control panel 156 for detailed analysis. In some embodiments, after the RF signal is received and initially amplified, it may require further amplification to facilitate the signal being at an optimal level for processing. In some embodiments, an additional RF amplifier within the receiver unit 122 may boost the signal strength while maintaining its integrity. The amplified signal may be subjected to more advanced filtering by the filter circuit, which removes any residual noise and unwanted frequencies that might have passed through the initial filtering stage. In some embodiments, the filtering may involve bandpass filters that allow only the desired frequency range to pass through. The filtered analog signal may be converted into a digital format using the ADC 136. The ADC samples the analog signal at a high rate and converts it into a series of digital values. The digitized signal may be processed using digital techniques. The digital signal may be fed into the DSP 138 within the receiver unit 122. In some embodiments, the DSP 138 may perform initial data processing tasks such as demodulation, noise reduction, and feature extraction. Demodulation involves extracting the original information-bearing signal from the carrier wave. Noise reduction techniques may further clean the signal, making it easier to analyze. Feature extraction may involve identifying characteristics of the signal that are indicative of the presence of target materials.

The detection module 160 commands the receiver unit 122 to send, at step 212, the output to the control panel 156. The receiver unit 122 transmits the processed data to the control panel 156 for further analysis and decision-making, which may involve packaging the data in a suitable format, establishing a communication link, and ensuring the accurate and secure transmission of the data from the receiver unit 122 to the control panel 156. The resultant data from the DSP 138 process is organized and packaged, which may involve structuring the data into packets, adding metadata such as timestamps and identifiers, and incorporating error-checking codes to facilitate data integrity during transmission. The receiver unit 122 may establish a communication link with the control panel 156 through wired connections, such as coaxial cables, or wireless communication protocols, such as Wi-Fi, Bluetooth, etc. The receiver unit 122 sends the packaged data over the established communication link. In some embodiments, the digital data packets may be converted into a format suitable for transmission over the communication link. In some embodiments, the control panel 156 receives the transmitted data packets and may demodulate the incoming signals, if wireless, and reconstruct the original data packets. In some embodiments, the control panel 156 may perform error-checking using the codes embedded in the packets to provide that the data has been transmitted accurately and without corruption. In some embodiments, the control panel 156 may use advanced algorithms and stored profiles of target materials to analyze the received data. In some embodiments, the control panel 156 may make decisions based on the analysis regarding the presence of target materials. In some embodiments, the control panel 156 may trigger alerts, log the detection event, or initiate further actions for the detection system's operational protocol. In some embodiments, the control panel 156 may send the resultant data from the DSP 138 to the network 164 and/or the user device 166 to be further analyzed or viewed by an operator.

The functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

What is claimed is:

1. A system for identification of a detected material, the system comprising:

a transmitter that transmits an electromagnetic signal into an external environment, the signal transmitted within the super low frequency (SLF) range and has a resonance frequency corresponding to a material located within the external environment;

a phased array antenna assembly comprising a plurality of phased array elements controlled by a phase shifter that tunes the phased array elements to the SLF range and a dynamic phase adjustment algorithm that steers a directional beam formed by the plurality of tuned phased array elements toward the environment in order to receive a response signal from the environment for the electromagnetic signal, wherein the dynamic phase adjustment algorithm adjusts a beam direction based on dynamic real-time feedback thereby increasing signal strength at the resonance frequency; and a receiver unit that analyzes the response signal using a detection algorithm to detect resonance characteristics that indicate a presence of the material within the external environment, wherein a digital signal processor at the receiver unit includes a machine learning module trained to isolate and identify signals at the resonance frequency, thereby improving accuracy of the detection algorithm.

2. The system of claim 1, wherein the phased array antenna assembly is housed in a non-ferrous frame that minimizes near-field interference.

3. The system of claim 1, wherein the phased array antenna assembly includes a plurality of radiating elements with phase and amplitude that can each be adjusted during a beamforming operation.

4. A method for detecting a material in an external environment, the method comprising:

transmitting an electromagnetic signal at a resonance frequency into the external environment, wherein the signal is within the super low frequency (SLF) range and has a resonance frequency that corresponds to the material to be detected, and phase and amplitude of the signal are adjusted prior to transmission;

receiving a response signal from the external environment at a phased array antenna assembly, wherein the phased array antenna assembly includes a plurality of phased array elements controlled by a phase shifter that tunes the phased array elements to the SLF range and a dynamic adjustment algorithm stored in and executable from memory to steer a directional beam formed by the plurality of tuned phased array elements and adjust a beam direction based on dynamic real-time feedback thereby increasing signal strength at the resonance frequency;

processing the response signal using a detection algorithm to detect resonance characteristics at a receiver unit that includes a machine learning module trained to isolate and identify signals from the external environment at the resonance frequency; and outputting an identification of the material when the resonance characteristics indicate a presence of the material in the external environment.

5. The method of claim 4, further comprising adjusting both phase and amplitude of each of the plurality of antenna elements of the phased array antenna assembly during a beamforming operation.

6. The method of claim 5, wherein the beamforming operation constructively combines signals in a direction of the external environment.

7. The method of claim 5, wherein the beamforming operation creates destructive interference in a direction of the external environment.

8. The method of claim 4, further comprising aligning a directional shield relative a direction of the material thereby reducing an amount of near-field interference.

* * * * *